US006231313B1

(12) United States Patent
Heitmann et al.

(10) Patent No.: US 6,231,313 B1
(45) Date of Patent: May 15, 2001

(54) DE-ICING SYSTEM

(75) Inventors: Arnold M. Heitmann, Swampscott, MA (US); Robert G. Littlefield, Vienna, VA (US)

(73) Assignee: Tanner Systems, Inc., Saint Cloud, MN (US)

( * ) Notice: Subject to any disclaimer, the term of this patent is extended or adjusted under 35 U.S.C. 154(b) by 0 days.

(21) Appl. No.: 09/012,396

(22) Filed: Jan. 23, 1998

Related U.S. Application Data
(60) Provisional application No. 60/036,630, filed on Jan. 31, 1997, and provisional application No. 60/042,446, filed on Mar. 27, 1997.

(51) Int. Cl.$^{7}$ ................................ F04F 19/24; E03B 7/10

(52) U.S. Cl. ................................................ 417/55; 138/34

(58) Field of Search .......................... 417/53, 55; 138/34, 138/32

(56) References Cited

U.S. PATENT DOCUMENTS

| | | | |
|---|---|---|---|
| 2,733,733 | 2/1956 | Ghormley | 138/34 |
| 2,812,899 | 11/1957 | Meschino | 230/132 |
| 2,832,528 | 4/1958 | Spears, Jr. | 230/132 |
| 3,129,267 | 4/1964 | Alfieri | 261/99 |
| 3,384,123 | 5/1968 | Saddison | 138/34 |
| 4,038,815 | 8/1977 | Heitmann et al. | 60/39.08 |
| 4,040,251 | 8/1977 | Heitmann et al. | 60/39.36 |
| 4,697,520 | 10/1987 | Brassert et al. | 102/334 |
| 4,717,075 | 1/1988 | Carter et al. | 239/398 |
| 4,744,724 | 5/1988 | Brassert et al. | 415/158 |
| 5,344,314 | 9/1994 | Zagoroff et al. | 432/222 |
| 5,408,835 | 4/1995 | Anderson | 62/82 |
| 5,476,378 | 12/1995 | Zagoroff et al. | 432/222 |

OTHER PUBLICATIONS

Catalog entitled, "Tanner Today—Catalog of De–Icing Solutions," by Tanner Systems, Inc., 1990, 12 pages.
Article entitled, "Snow–Making Equipment—Boon to a Growing Industry," by Tanner Systems, Inc., undated (but before Jul. 1996), 3 pages.
Advertisement entitled, on one page, "Frosto® Vaporizer Tanner Tanks," and on the opposite page, "Tanner's Compact De–Icers," by Tanner Systems, Inc., 1992, 2 pages.
Advertisement entitled, "No–Tox 2™, " by Tanner Systems, Inc., 1990, 2 pages.
Brochure entitled, "Feature Story: Superior de–icing systems are demanded in industries as diverse as sawmill operations and heavy construction.", by Tanner Systems, Inc., undated (but before Jul. 1996), 4 pages.
Advertising flier entitled, "New Turbo De–Icer From Tanner!!!", by Tanner Systems, Inc., 1 page (1996).

*Primary Examiner*—Henry C. Yuen
*Assistant Examiner*—Mahmoud M Gimie
(74) *Attorney, Agent, or Firm*—Steven P. Shurtz; Brinks Hofer Gilson & Lione

(57) ABSTRACT

A method of dispersing de-iceant into a stream of air flowing through an air supply line comprises the steps of placing a turbine in the air supply line; forcing at least a portion of the stream of compressed air to pass through the turbine, thus causing the turbine to spin; and using the spinning turbine to atomize the de-iceant. A preferred turbine both generates an electrical current and disperses a liquid de-iceant and comprises a rotatable shaft; a rotor connected to the shaft; a stator surrounding the rotor and being prevented from turning; electrical conductors connected to the stator; one or more blades connected to the rotating shaft at an angle to the direction of flow of air past the shaft so as to cause the shaft to rotate as air flows past the blades; a centrifuging surface connected to the shaft; and a conduit for supplying de-iceant to the centrifuging surface.

47 Claims, 16 Drawing Sheets

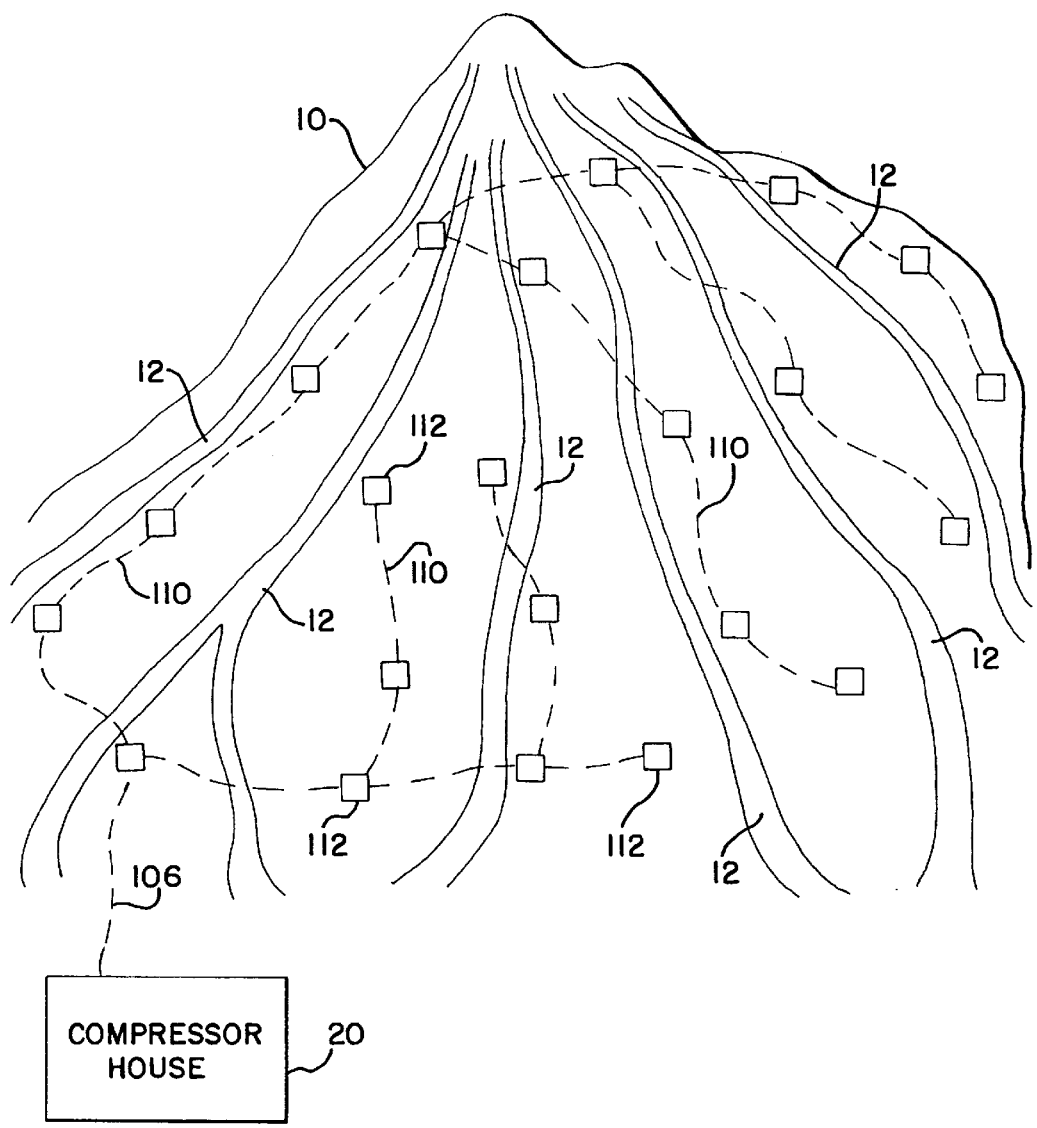

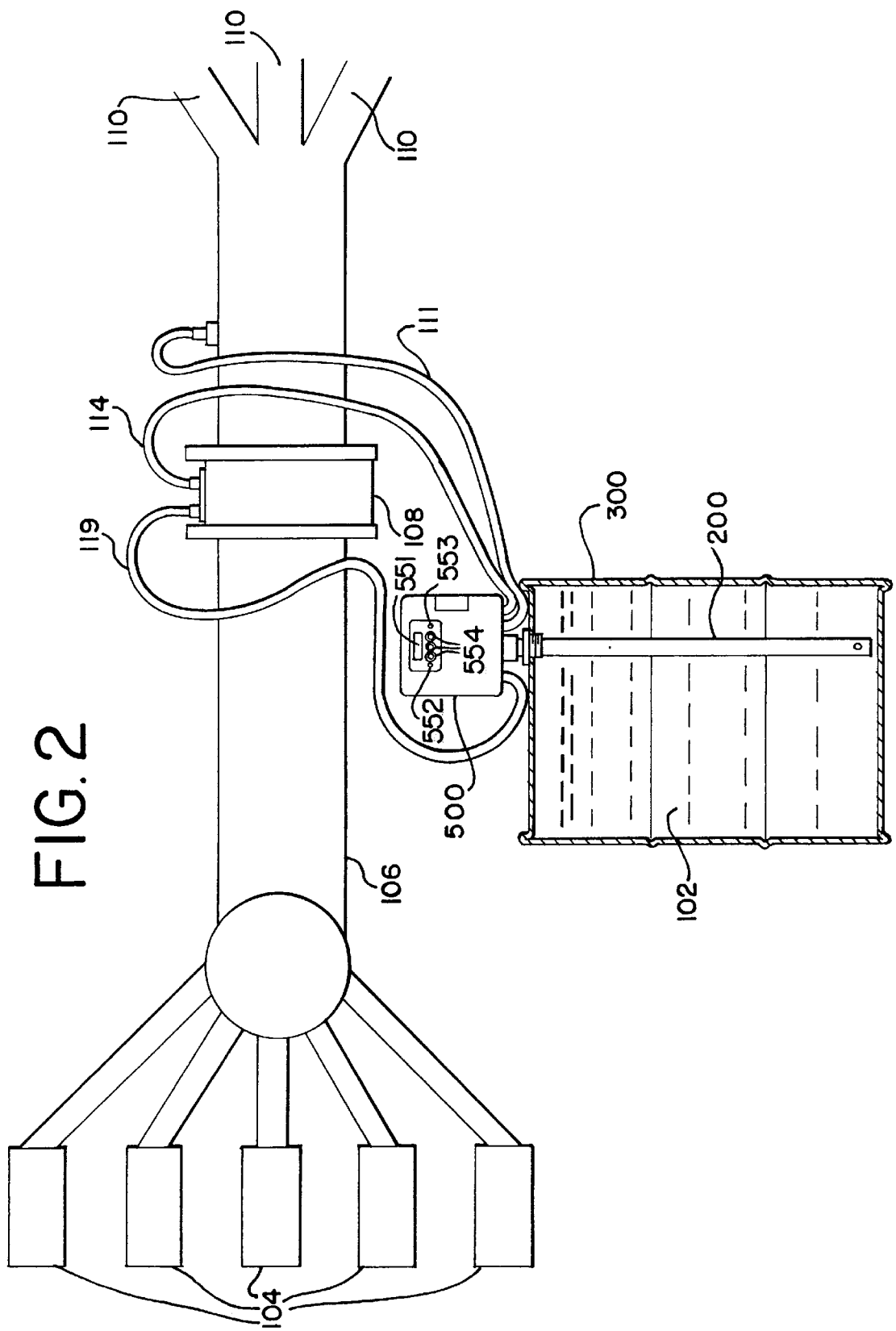

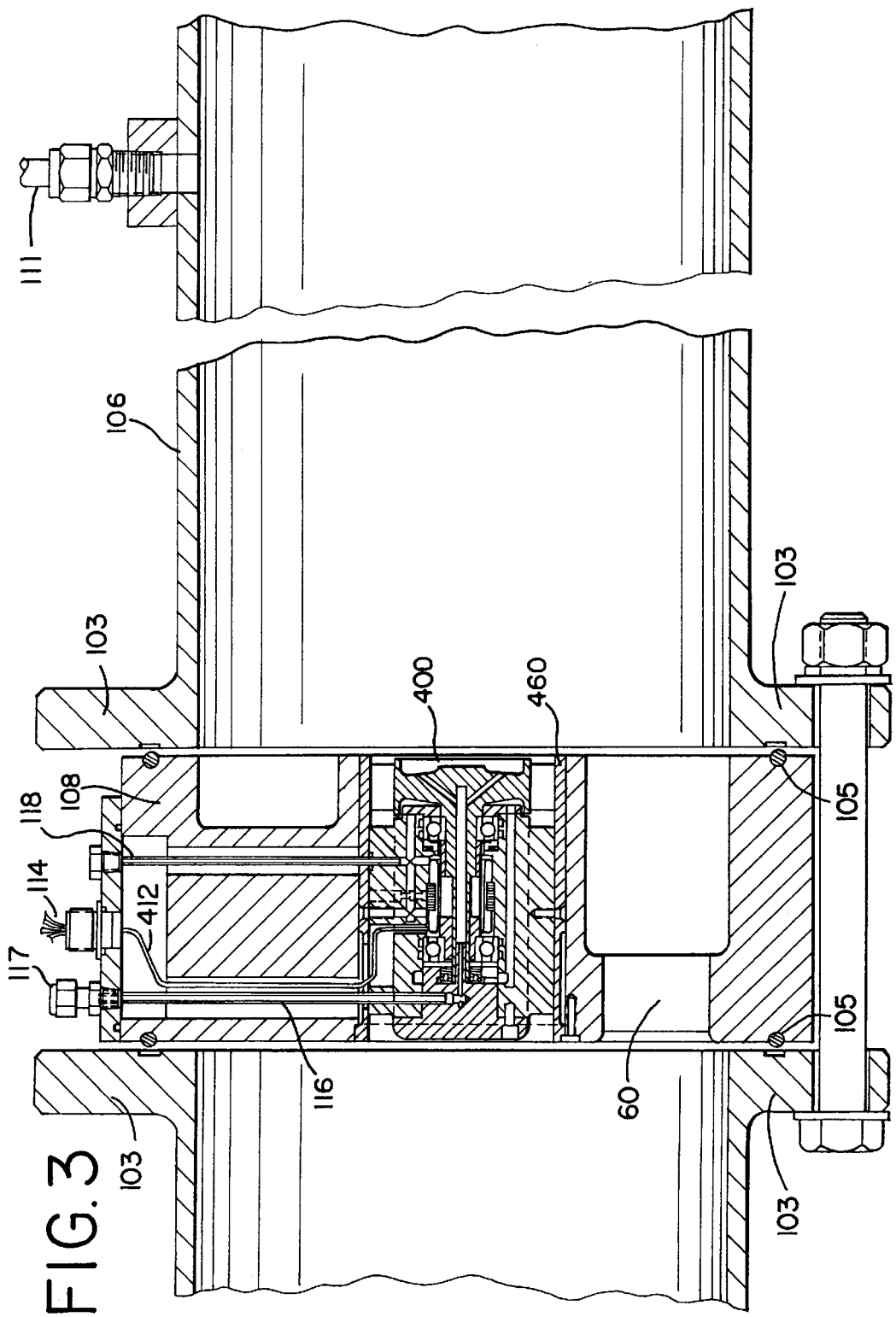

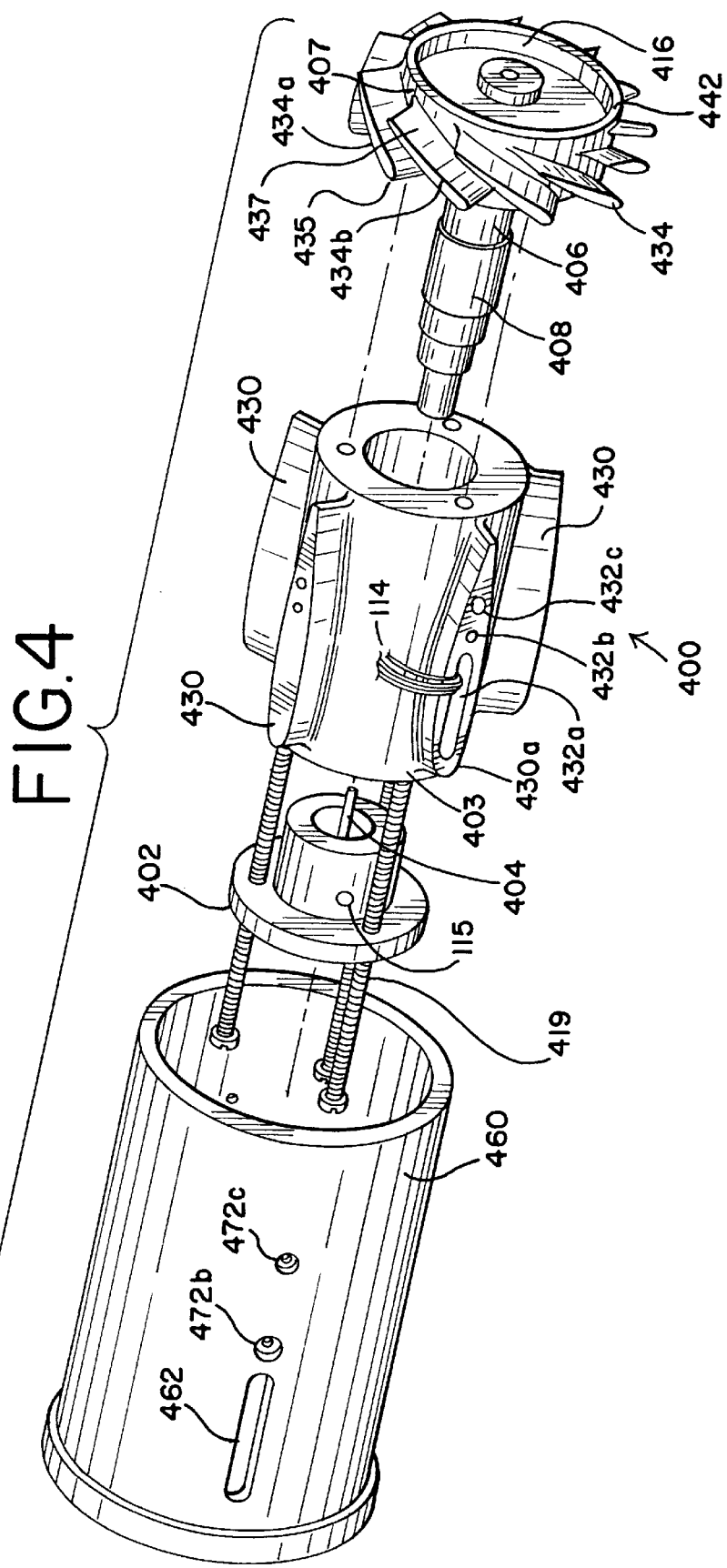

Figure 7:
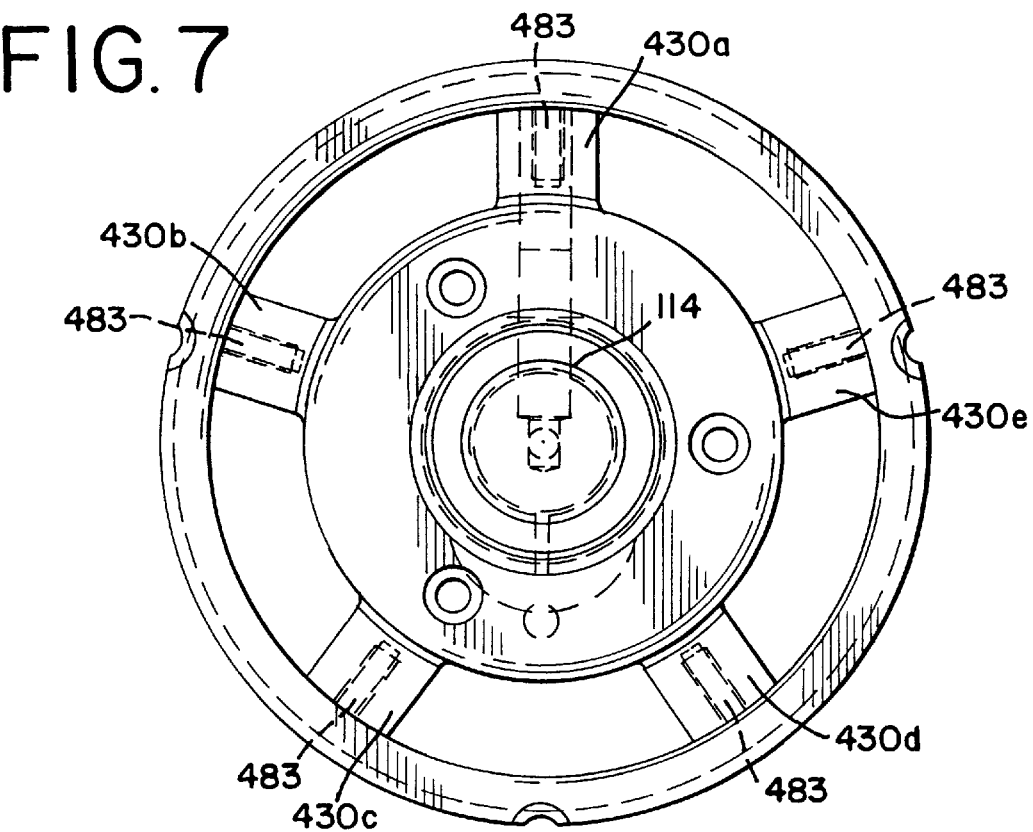

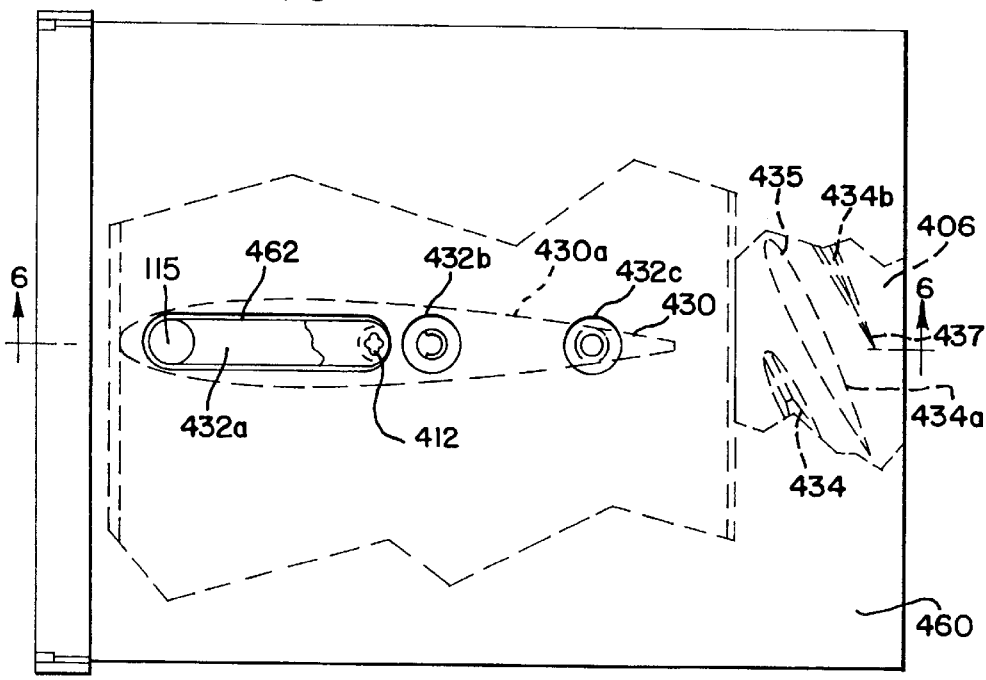
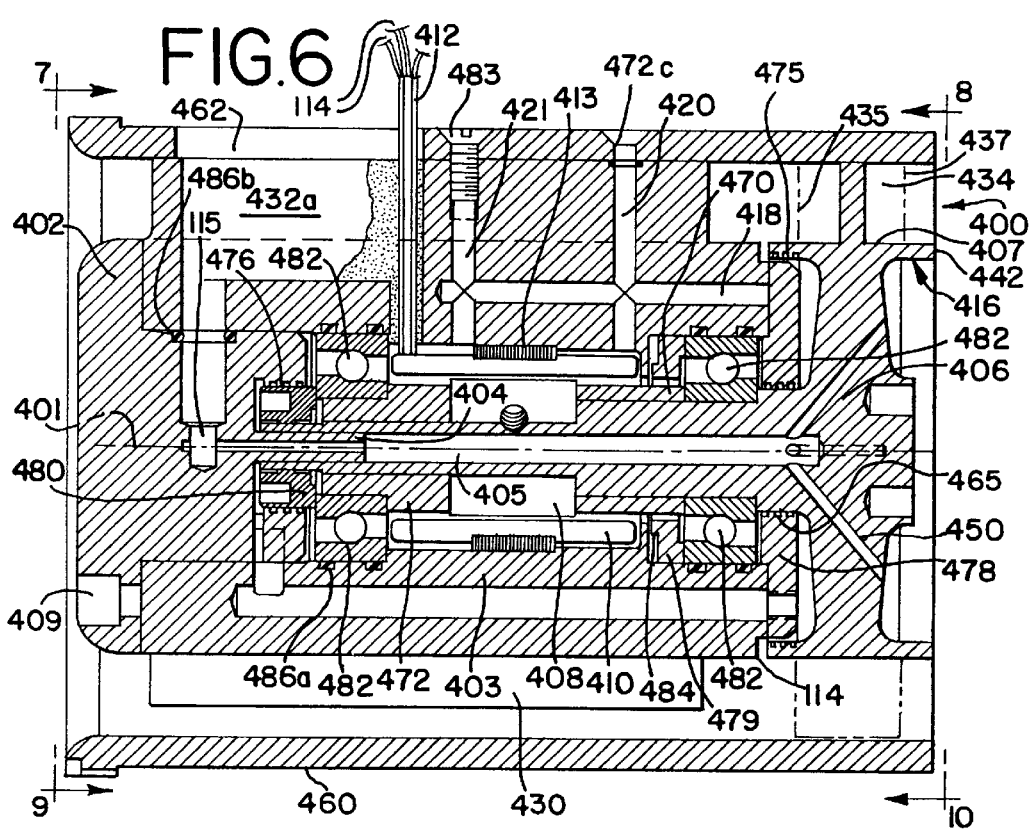

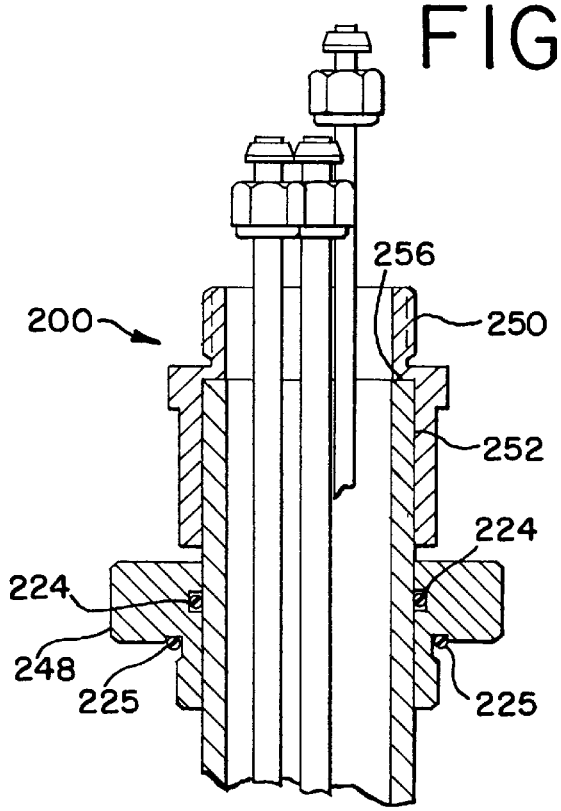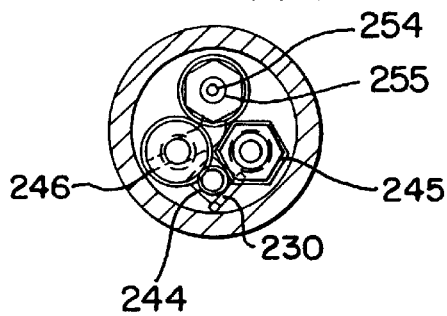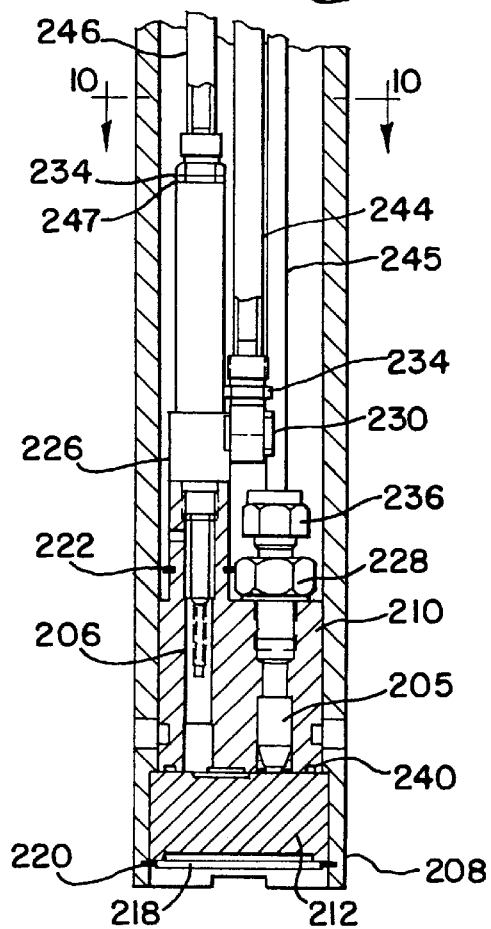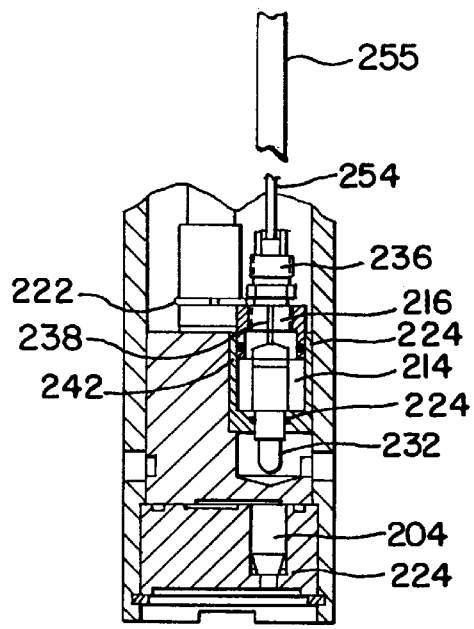

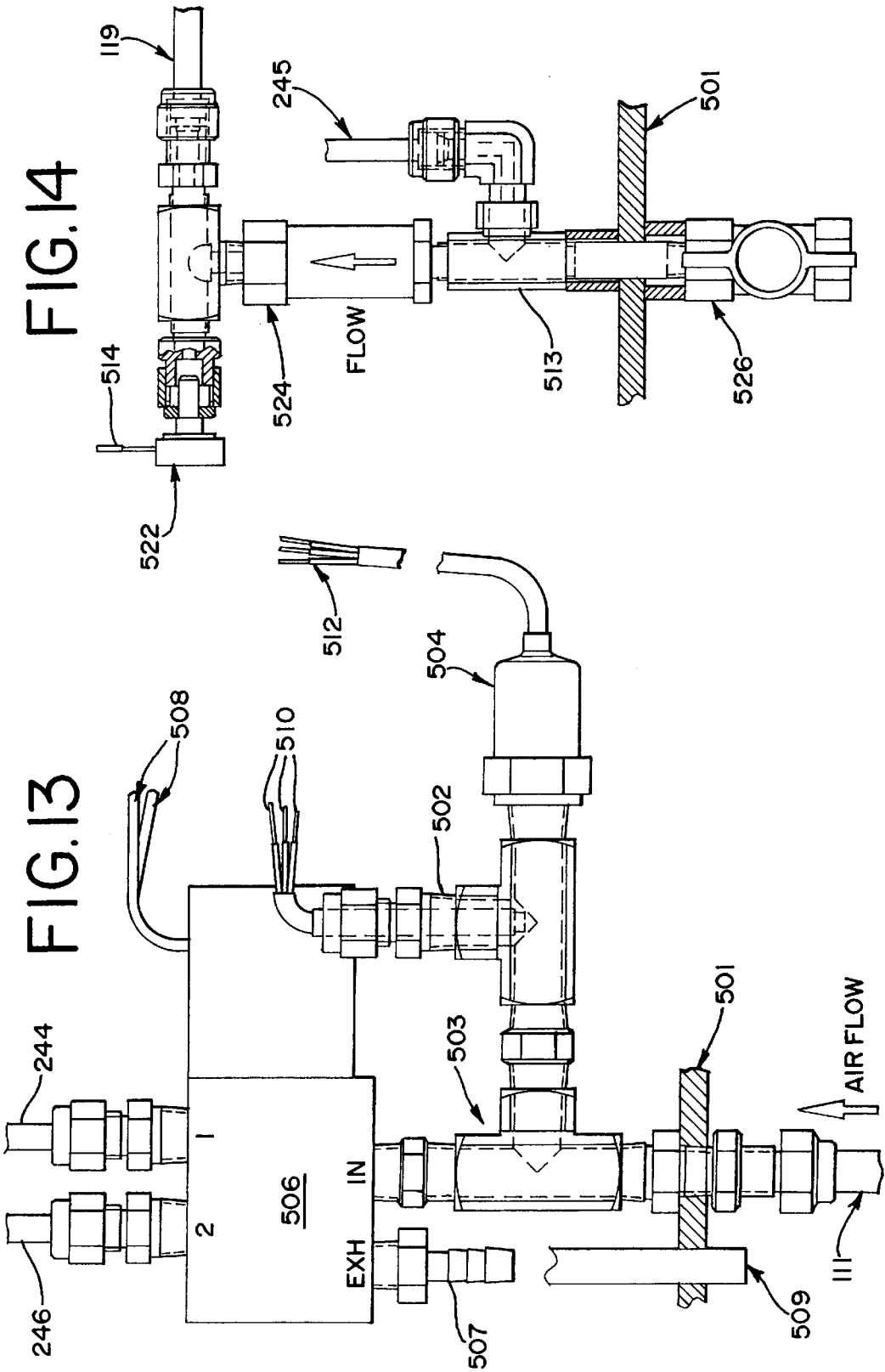

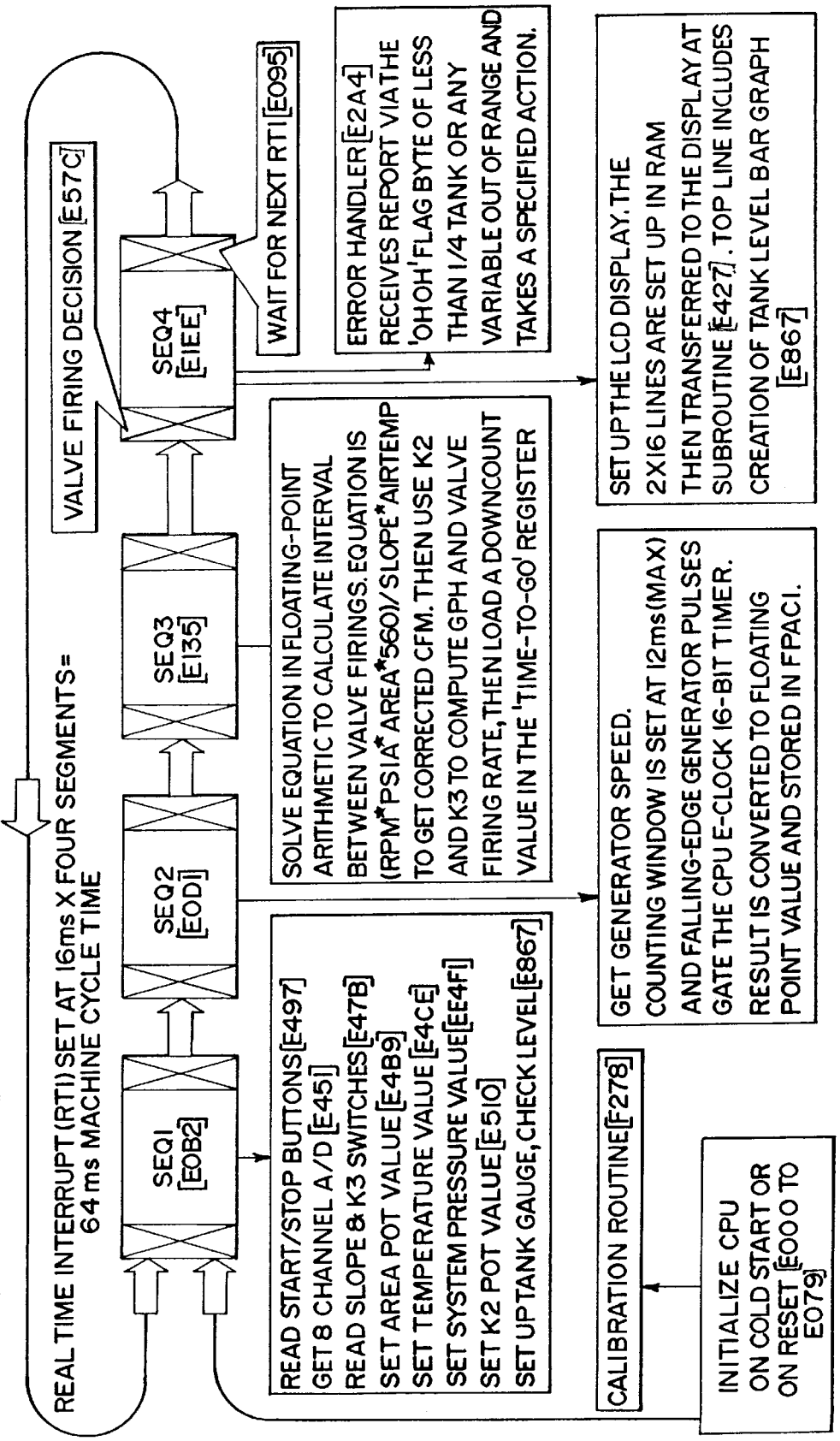

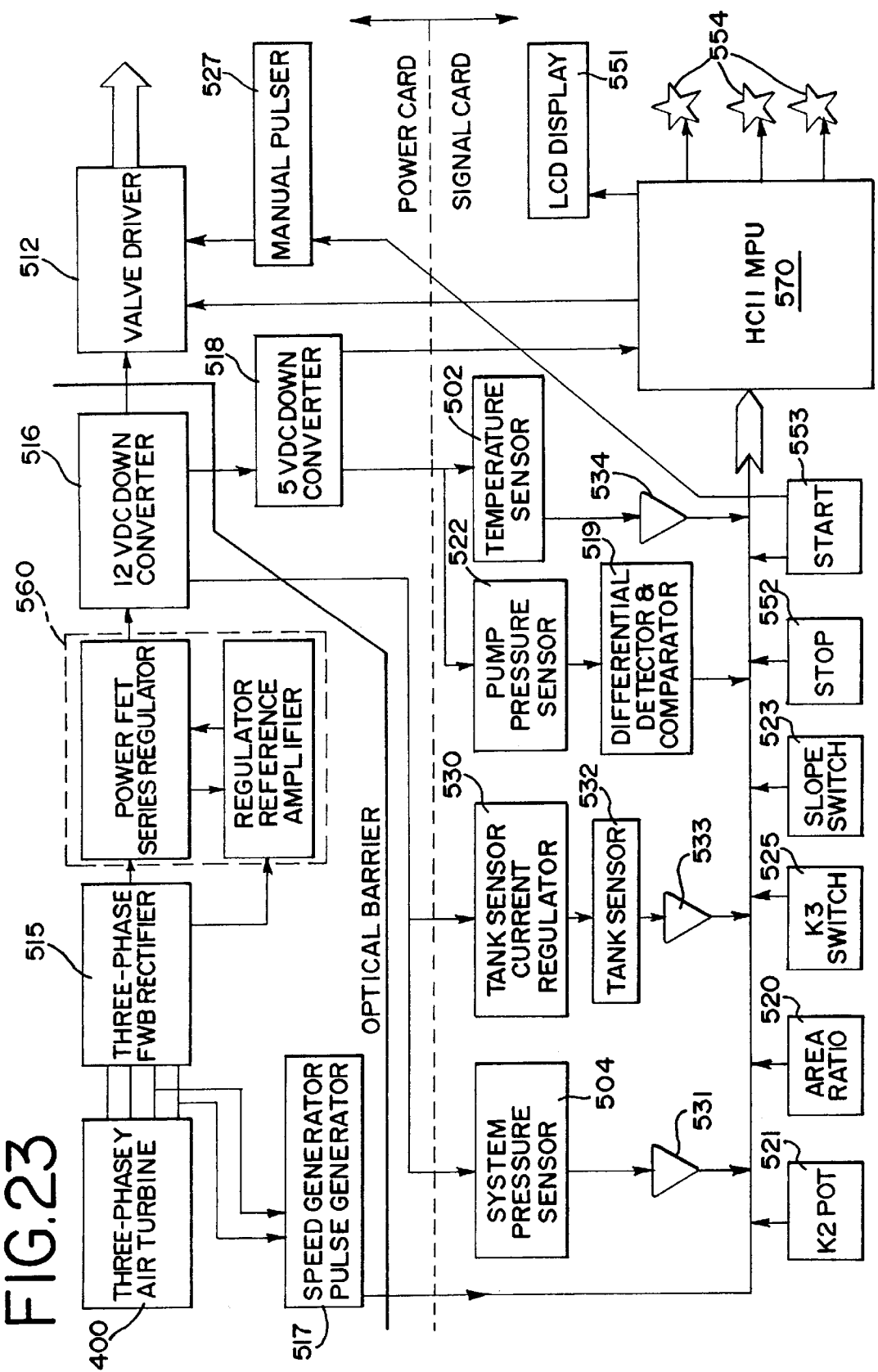

DE-ICING SYSTEM

REFERENCE TO EARLIER FILED APPLICATION

The present application claims the benefit of the filing dates under 35 U.S.C. §119(e) of provisional U.S. patent applications Ser. No. 60/036,630 filed Jan. 31, 1997 and Ser. No. 60/042,446 filed Mar. 27, 1997.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to de-icing systems, and particularly to systems which prevent either water vapor or entrained water droplets in compressed air from freezing and clogging up compressed air lines or devices which use compressed air, or both, in low temperature environments. The invention also relates to a novel turbine which is particularly well suited for the de-icing system.

Many mechanical devices use compressed air as a source of power. Other devices use compressed air in other ways for their operation. For example, artificial snow making devices use compressed air to atomize water and distribute the artificial snow over a ski area. Many compressed air systems are designed to be operated in low temperature environments. For example, a sawmill may use compressed air as a power supply source, and the machinery may be located in unheated buildings and used during the winter. Many other outdoor operations, including construction sites, quarries, railroads and marine applications, use compressed air. Air naturally contains water vapor, measured by the term "humidity". When the air is compressed, the water vapor is also compressed. As the compressed air is cooled while under pressure, some of the water vapor condenses into water droplets. If the compressed air is moving, the water droplets often remain entrained or suspended in the moving air stream. As a result, the compressed air thus includes water vapor and entrained water droplets.

There are a number of systems and processes for removing water from compressed air, either using an after-cooler and a separator to remove entrained water droplets, or desiccant dryer to remove water vapor, or both. However, it is usually not cost efficient to remove all of the moisture from the air. This remaining moisture (water vapor or entrained water droplets or both) can then freeze up in the air supply lines, when operating below 32° F., or in the devices that use compressed air when the expansion of the compressed air causes the temperature of the air to fall below freezing.

One solution to preventing water in compressed air lines from freezing is to add a de-iceant to the air. The de-iceant combines with the water and lowers the freezing point of the resulting mixture, much as antifreeze works in a cooling system. Most de-iceants are alcohol-based. However, these cannot be used in some situations, such as in underground mining operations or other confined areas, because the alcohol is combustible and toxic. Other less frequently used de-iceants are propylene glycol-based which are less toxic and non-combustible. One problem with these de-iceants, however, is that they are more viscose, and thus harder to effectively add to compressed air.

One procedure for adding de-iceants is to have a container filled with de-iceant connected to the compressed air line with a venturi system that draws the de-iceant from the container as the compressed air flows past. This system does not atomize the de-iceant. Venturi systems work well on small air lines, up to two inches in diameter or less than 1000 cfm air flow. However, they require repeated refilling of small storage containers. If there are numerous air lines, such venturi systems require the containers filled with de-iceant to be scattered around the compressed air system, with the associated labor-intensive requirement of replenishing the contents of the containers. For larger systems, a larger de-iceant storage tank is desirable, with a controllable valve for introducing de-iceant into the air stream. For instance, a vaporizer may be used to heat the de-iceant to a vapor state, in which it is injected into the compressed air lines. However, a heated vaporizer is not suitable for propylene glycol-based de-iceants.

Another consideration in adding de-iceant is control over the amount of de-iceant added to the compressed air. The optimum amount of de-iceant is dependent on a number of variables, including the moisture content of the compressed air, the flow rate of the compressed air and the ambient temperature. Since these variables can and do change, particularly the flow rate of the compressed air, the optimum amount of de-iceant to add changes. Venturi and other tank systems are generally provided with some control features, and inherently change the feed rate as the flow rate changes. However, for larger compressed air systems using a vaporizer, typical vaporization units do not have a way of automatically changing supply rates as the compressed air flow rate changes. Thus, one adding de-iceant at a constant rate must either add an amount to meet the highest air usage, which would be wasteful when not operating at peak demand, or face potential freeze ups if an insufficient amount is added and the air usage rate goes up. Since the cost of unclogging frozen air lines and the associated down time of operating equipment is so great, operators tend to use more de-iceant than is needed.

Thus, there is a need for a de-icing system which can controllably add a de-iceant to a high volume compressed air stream, preferably a de-iceant that is non-combustible and less toxic than alcohol based de-iceants. It would also be beneficial if the system were capable of monitoring the flow rate of compressed air and automatically changing the rate of addition of de-iceant.

SUMMARY OF THE INVENTION

A de-icing system has been invented that adds a de-iceant to a high volume compressed air stream in a controllable fashion, with the rate of addition being automatically controlled so that the rate of de-iceant addition can match changes in the flow rate of air in the system. In the preferred embodiment of the invention, a turbine is used to both measure the air flow rate and disperse the de-iceant.

In a first aspect, the invention is a method of dispersing de-iceant into a stream of air flowing through an air supply line comprising the steps of: a) placing a turbine in the air supply line; b) forcing at least a portion of the stream of compressed air to pass through the turbine, thus causing the turbine to spin; and c) using the spinning turbine to atomize the de-iceant.

In a second aspect, the invention is a method of adding de-iceant to compressed air comprising the steps of: a) detecting the rate of flow of compressed air through an air supply line; and b) pumping de-iceant from a de-iceant supply source and dispersing the de-iceant into the air flowing through the air supply line at a rate proportional to the detected rate of flow of compressed air through the air supply line.

In a third aspect, the invention is a method of preventing water in compressed air from freezing up inside of a compressed air supply line or a compressed air usage device comprising the steps of: a) forcing compressed air through the air supply line to one or more compressed air usage devices; b) causing a turbine to spin at a rate proportional to the rate of air flow through the air supply line; and c) dispersing de-iceant into the compressed air flowing through the air supply line at a rate proportional to the turbine spin rate.

In a fourth aspect, the invention is a system of injecting de-iceant into a flowing stream of compressed air comprising: a) a turbine within the flowing air stream; b) a source of liquid de-iceant; c) a de-iceant supply device in fluid communication with the source of de-iceant for injecting de-iceant into the stream of compressed air; and d) a controller which controls the rate of de-iceant injection and is connected to the turbine and the de-iceant supply device.

In a fifth aspect, the invention is a compressed air system comprising: a) one or more compressors; b) an air supply line into which compressed air is forced by said one or more compressors; c) one or more compressed air usage devices receiving compressed air from the air supply line; d) a turbine in the air supply line; e) a source of de-iceant; and f) a de-iceant supply device connected to the turbine and the de-iceant source.

In a sixth aspect, the invention is a turbine which both generates an electrical current and disperses a liquid de-iceant comprising: a) a rotatable shaft; b) a rotor connected to the shaft; c) a stator surrounding the rotor and being prevented from turning; d) electrical conductors connected to the stator; e) one or more blades connected to the rotating shaft at an angle to the direction of flow of air past the shaft so as to cause the shaft to rotate as air flows past the blades; f) a centrifuging surface connected to the shaft; and g) a conduit for supplying de-iceant to the centrifuging surface.

The unique turbine developed for use in the preferred embodiment of the invention allows the de-icing system to operate as a stand-alone system, since it generates electrical power necessary to operate the system. The unique turbine also sends a signal proportional to the flow rate of air through the compressed air supply pipe in which the turbine is located. The preferred controller takes this information and supplies liquid de-iceant at a rate proportional to the air flow rate. In addition, the unique turbine is used to atomize the de-iceant.

BRIEF DESCRIPTION OF THE DRAWINGS

FIG. 1 is a schematic representation of a ski hill at which the preferred embodiment of the invention is put into use.

FIG. 2 is a schematic representation of the de-iceant supply system of the preferred embodiment of the present invention used in a compressed air system.

FIG. 3 is a cross-sectional view of the compressed air line of FIG. 1 showing the preferred turbine and housing of the present invention.

FIG. 4 is an exploded perspective view of the turbine and housing of FIG. 3.

FIG. 5 is a top plan view of the turbine and housing of FIG. 3.

FIG. 6 is a cross-sectional view taken along line 6—6 of FIG. 5.

FIG. 7 is an end elevational view taken along line 7—7 of FIG. 6.

FIG. 8 is an end elevational view taken along line 8—8 of FIG. 6.

FIG. 9 is a cross-sectional view of the pump assembly of the preferred embodiment of the present invention.

FIG. 10 is a cross-sectional view taken along line 10—10 of FIG. 9.

FIG. 11 is a partial cross-sectional view similar to FIG. 9 but showing the base of the pump assembly.

FIG. 12 is a perspective view of the control box of the preferred embodiment of the present invention with the front cover open.

FIG. 13 is an elevational view in partial cross section of the air subassembly within the control box of FIG. 12.

FIG. 14 is an elevational view in partial cross section of the de-iceant subassembly within the control box of FIG. 12.

FIG. 15 is a block diagram of the logic for the electronic controller in the control box of the present invention.

FIG. 16 is a graph of data correlating air flow and turbine speed.

FIG. 17 is a schematic diagram of the air portion of the control box of the present invention.

FIG. 18 is a schematic diagram of the de-iceant portion of the control box of the present invention.

FIG. 19 is a listing of ranges and settings for the remote sensors and panel controls of the present invention.

FIG. 20 is an electrical schematic for the voltage regulator circuit used in the control box of FIG. 12.

FIG. 21 is a graph of the input and output characteristics of the circuit of FIG. 20.

FIG. 22 is a flow chart of the computer software used to run the control system of the pump of FIG. 9.

FIG. 23 is a block diagram of the electrical system and circuit boards in the control box of FIG. 12.

DETAILED DESCRIPTION OF THE PRESENTLY PREFERRED EMBODIMENTS

Air flow rates used herein are based on air at standard temperature and pressure. Of course the actual volumetric flow rate of compressed air will generally be less than the air flow rate at standard temperature and pressure.

The preferred embodiment of the present invention relates to the turbine itself, a de-icing system, and an installation where the de-icing system is used. All of these can be best explained by reference to a de-icing system installed at a ski hill on a mountain 10 shown in FIG. 1. The ski hill includes numerous ski runs 12 coming down the face of the mountain 10. An artificial snow making operation is also depicted in FIG. 1. The artificial snow making operation uses compressed air, supplied from compressor house 20, and water, fed through conventional snow making nozzles 112 to produce snow on the ski runs 12. In this embodiment, the nozzles 112 constitute air usage devices. In other installations, the air usage deices could be pneumatic powered tools, air cylinders or any variety of devices which use compressed air. Water is supplied to the nozzels 112 by water lines that typically follow the same path as air supply lines 110 buried under the face of the mountain 10. The snow making equipment, air and water lines are conventional, and therefore need not be described in detail. The individual or branch air supply lines 110 are generally connected to a main air supply line 106. That main air supply line 106 may be supplied by several compressors 104, as depicted in FIG. 2. A ski hill may, for example, have eight compressors feeding into a 16 inch main air supply line 106. Typically, the compressed air systems of the present invention will use maximum air pressures from 75–125 psig, and more preferably 90–100 psig.

FIG. 2 also shows the other major components of the preferred embodiment of the system for injecting de-iceant 102 into a flowing stream of compressed air. The preferred system depicted includes a source of liquid de-iceant 102, in this case a container, preferably a barrel 300, a de-iceant supply device, in this case a pump 200 located in a standpipe within barrel 300, a turbine 400 (FIG. 3) housed within the main air supply line 106 and a controller which is housed in control box 500. These parts act together to supply the de-iceant 102 in the proper amounts to the turbine 400. As shown in FIG. 2, de-iceant 102 flows from the de-iceant supply device 200 to the turbine 400 through a hose 119 to conduit 116. Wires 114 from the turbine to the de-iceant supply device 200 transmits alternating current to the control box 500.

Preferably, the turbine 400 is mounted in a plate or adapter 108 (hereinafter "plate 108") that can be installed between flanges 103 of an existing air supply line 106. Preferably large O-rings 105 are used to seal the flanges 103 to the plate 108. The plate 108 contains passageways 60 for air to flow through the plate, as well as a place to mount the turbine 400. Different sizes of main air supply lines 106 will require different sizes of plates 108. For example, there will preferably be different size plates 108 for each of the standard sizes of main air supply lines, such as 8, 10, 12, 18 and 20 inch diameter air supply lines. However, the same turbine 400 can be used in each size of plate 108. The plates 108 preferably mount to standard pipe flanges used on sections of compressed air lines as shown in FIG. 3.

The components of the turbine 400 are depicted in FIGS. 3–8. The turbine 400 is comprised of a rotatable shaft 406, a rotor 408 connected to the shaft 406, a stator 410 surrounding the rotor 408, electrical conductors 412 connected to the stator 410, blades 434 connected to the rotatable shaft 406, a centrifuging surface 416 connected to the shaft 406 and a conduit 405 for supplying de-iceant 102 to the centrifuging surface 416. A turbine body 403 holds the foregoing parts of the turbine 400 assembly together and has five vanes 430 to direct flow to the blades 434. In addition, a forward cover 402 covers the front of the turbine and has an extension 404 that fits into shaft 406. The forward end of the cover 402 is a cylindrical plate that contains screw holes 409 that penetrate its thickness and a radial hole 115 to accommodate a de-iceant supply conduit 116 (FIG. 3) that fits with an O-ring seal into hole 115. Three screws 419 hold the cover 402, body 403 and other turbine parts together.

Figure 8:
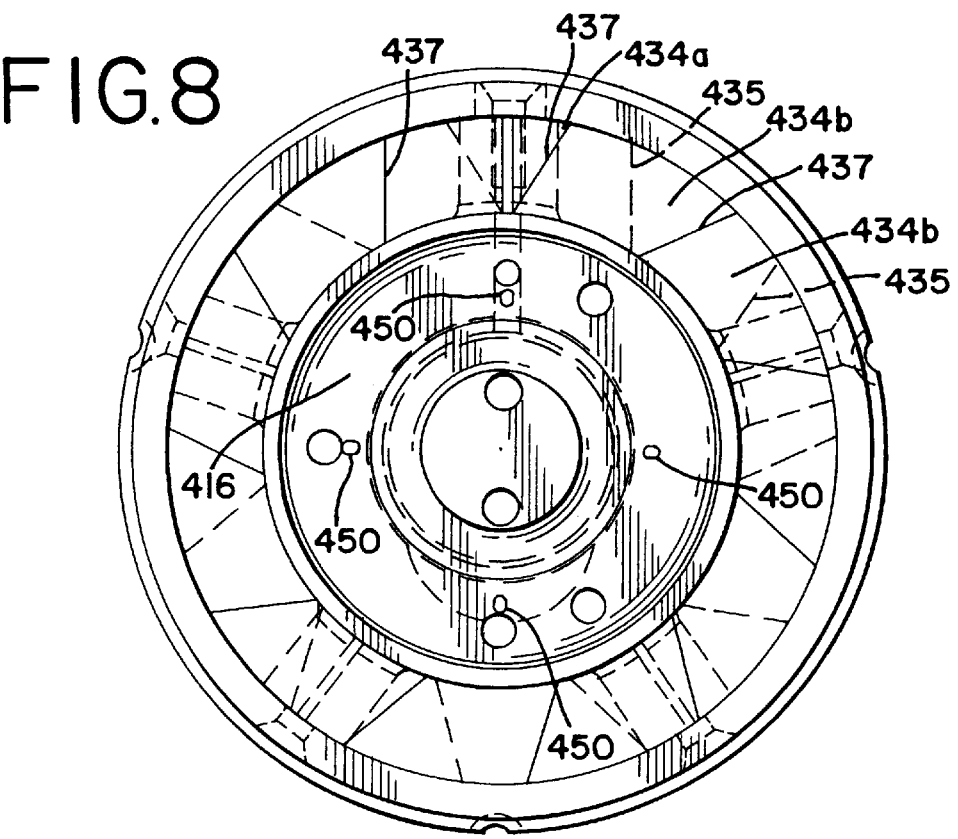

Referring to the turbine 400 assembly depicted in FIG. 6, the rotatable shaft 406 is positioned in the axial center 401 of the turbine 400 assembly. In a preferred embodiment, the rotatable shaft 406 is made of stainless steel. It starts out shaped cylindrically at one end of the turbine assembly 400 and has a fixed diameter for a given length, then the diameter is incrementally increased. The rotatable shaft 406 has a hollow cylinder of a uniform diameter along its length. A conduit 405, discussed infra, extends through this hollow portion of the shaft 406. As shown in FIG. 8, the rearward end of the shaft 406 includes a large diameter section 407. The shaft 406 is powered and rotated by the turning of the turbine blades 434 attached to this large diameter section 407.

A stator 410 is axially oriented around the rotor and cylindrically shaped. In a preferred embodiment, the stator is preferably made of silicon steel laminations. The stator includes windings 413. The center of the stator 410 is hollow to provide a space for the rotor 408.

Within the turbine body 403 are longitudinal passageway 418 and radial passageways 420 and 421. As shown in FIG. 6, the radial passageways 420 and 421 are perpendicular to the axially aligned stator 410. The passageway 418 is parallel to the axis of the stator. The longitudinal passageway 418 and radial passageways 420 and 421 may be used to conduct grease to the inner workings of the turbin 400 if needed, but are normally plugged, such as by screw 483 and plug rod 118 (FIG. 3).

Referencing FIG. 6, two bearings 482 surround the rotatable shaft 406. The bearings 482 facilitate the rotation of the shaft 406. In addition, a bearing nut 480 keeps the bearing closest to the forward cover 402 in place. Situated next to the bearing at the rear end of the rotatable shaft 406 is a thrust plate 479. The thrust plate 479 is a thin cylinder with a hollow center that accommodates the rotatable shaft 406. A wave washer 484 is located in between the thrust plate 479 and the portion of the turbine body 403 surrounding the stator 410. Also adjacent to the rear bearing 482, the shaft 406 and the stator 410 but opposite to the thrust plate 479 is a turbine seal 478. The seal 478 is also cylindrical in shape with a hollow center that accommodates the shaft 406. The inner diameter of turbine seal 478 includes helical grooves 465 that act as a visco-seal to keep grease in the turbine body. The outer diameter includes helical grooves 475 to prevent dirt from entering into the turbine assembly.

As shown in FIG. 6, the rotor 408 surrounds the central portion of and is connected to the rotatable shaft 406. The rotor 408 is magnetic, so that as it turns, an alternating current is generated in the windings 413 of the stator.

As shown in FIG. 6, a turbine spacer 470 surrounds a portion of the rotatable shaft 406. The turbine spacer 470 acts to keep the rotor 408 in place. In addition to the turbine spacer 470, a forward spacer 472 is placed between the forward end of the rotor 408, the forward bearing 482 and the bearing nut 480. Like the turbine spacer 470, the forward spacer 472 assists in keeping the rotor 408 in place. The bearing nut 480 includes helical grooves 476 which act as a visco-seal.

Electrical conductors 412 are radially placed with the turbine 400 assembly. In a preferred embodiment, the conductors 412 are made up of four wires 114. One of these wires is neutral and the other three carry a voltage, the turbine acting as a three phase generator. The wires 114 transmit alternating current and this current is used as an input into the controller as well as to supply power for the controller.

As shown in FIGS. 4 and 5, blades 434 are connected to the rotating shaft 406. There are preferably eleven blades 434 in the preferred embodiment of the invention. The blades 434 are oriented at right angles with respect to the surface of the rearward large diameter end 407 of the rotatable shaft 406 and are angled to achieve a desired speed vs. flow relationship. As depicted in FIGS. 4 and 5, the blades 434 are airfoil in shape. FIG. 5 shows the shape of blade 434, although the blades are set in a reverse direction in FIGS. 5 and 6 to the direction shown in FIG. 4. Of course the direction of the blades will affect the rotational direction of the turbine, but this is not significant to the invention. FIGS. 4, 5 and 8 show how the blades spatially interrelate to one another. For example, the leading edge 435 of blade 434a is directly in front of the trailing edge 437 of blades 434b. The blades 434 cause the shaft 406 to rotate as air flows past the blades 434.

As best seen in FIG. 7, there are five turbine stator vanes 430 that direct the flow of air to the blades 434. The vanes 430 are also airfoil in shape. The vanes 430 are all of the same shape. However, vane 430a at the top of the turbine contains three holes 432a, 432b and 432c, as best seen in FIGS. 4, 5 and 6. Hole 432a is elliptical in shape and provides access for conduit 116 to reach the forward turbine cover 402 and a passageway for wires 114. Holes 432b and 432c provide access to passageways 420 and 421. The other vanes 430b, 430c, 430d and 430e are tapped to received a screw to mount the turbine to a housing 460.

The centrifuging surface 416 is formed on the rear face of the rotatable shaft 406. Referencing FIG. 6, the centrifuging surface 416 is a cylindrical surface on the end of the rotatable shaft 406. At the outer edge of the centrifuging surface 416 is a centrifuging lip 442. This centrifuging lip 442 is where atomization of the de-iceant 102 occurs. The de-iceant spreads out in a film over the centrifuging surface 416. Because of the high tip speed of centrifuging lip 442, the de-iceant is ejected into the compressed air at a direction normal to the flow of compressed air past the turbine. The droplet field covers the entire area within the air supply line 106. The small droplet size and high tip speed, and the high rate of air flow past the turbine, all combine to vaporize the de-iceant.

A conduit 116 for supplying de-iceant to the centrifuging surface 416, shown in FIG. 3, is a fixed length of tubing with a male connector 117 at its top. The conduit 116 fits into passageway 115 (FIG. 6) which connects to the conduit 405 in the center axis of the turbine 400. From there de-iceant flows to centrifuging surface 416 through multiple flow channels 450. In a preferred embodiment, there are four flow channels 450, spaced at 90 degree increments (see FIG. 8) within the enlarged section 407 of shaft 406 and disposed at an angle of 50° with respect to the center axis 401. Four O-rings 486a are used to provide liquid seals within the turbine at the bearings 482. O-ring 486b is used to seal the conduit 116 in hole 115.

As shown in FIGS. 3, 4 and 6, a housing 460 is used to mount the turbine 400 in plate 108. In a preferred embodiment the housing 460 is a cylindrical fiberglass tube. Referencing FIGS. 3 and 6, the housing 460 surrounds the turbine 400 assembly. As depicted in FIGS. 6 and 7, screws 483, such as cup point set screws, screw the housing 460 to the turbine body 403 at each vane 430. In a preferred embodiment, the housing 460 has a ceramic gel coat. Passageway 462 in the housing allows the wires 114 and the conduit 116 containing the de-iceant 102 to pass through the housing. Holes 472b and 472c are used for access to passageways 421 and 420 respectively.

As shown in FIGS. 9–11, in a preferred embodiment the de-iceant supply device comprises a pump 200. Referring to FIG. 9, the pump includes three cylindrically shaped tubes, 244, 245 and 246. Tubes 244 and 246 carry air. Tube 245 carries de-iceant. Each of these tubes in a preferred embodiment are made of nylon. FIG. 10 depicts the arrangement of these tubes from a top view. A standpipe 208 surrounds these tubes. The standpipe 208 is a hollow cylinder. As shown in FIG. 9, a male adaptor 250 is fixed around the top end 256 of the standpipe 208 by a PVC solvent 252. Also fixed on the outside of the standpipe 208 is a bung lock nut 248. This bung lock nut 248 is located just below the male adaptor 250. O-ring 224 acts to create a seal between the bung lock nut 248 and the standpipe 208 and O-ring 225 creates a seal between barrel 300 and the bung lock nut 248.

Concentrically within the standpipe 208 at the bottom is the pump housing 210. The lower portion of the housing 210 is solid and contains holes in which various parts of the pump are located and through which de-iceant flows between those parts.

A base 212 is at the bottom of the standpipe 208 and housing 210 assembly. The base contains a hole that accommodates a check valve 204 (FIG. 11). Attached to the bottom of the standpipe 208 is a filter screen 218 that is circular in shape. A spiral retaining ring 220 holds the filter screen 218 against the pump and holds the pump housing 210 in place.

Referencing FIG. 9, a piston and actuator assembly, preferably from Humphrey, is used to pump the de-iceant. The piston 206 is inside the housing 210. Just above the piston 206 and connected to the bottom of tube 246 is an actuator 226. A universal elbow 230 connects tube 244 to the actuator 226. As shown in FIG. 9, a poly-tite fitting 234 above the elbow 230 holds it in place. As shown in FIG. 9, tube 246 also includes such a poly-tite fitting 234, below which is a laminated shim stock 247.

The housing 210 contains a check valve 205. A flat washer 240 is situated between the check valve 204 and the pump base 212.

Adjacent to the check valve 205 is a pressure sensitive level switch 232 (FIG. 11). More preferably a liquid level transducer (not shown), is used in place of the liquid level switch 232. The level switch 232 has a dome shaped sensor attached to two solid cylinders that contain leads. A switch meeting tube 214 surrounds the upper portion of the level switch 232. This tube 214 is a hollow cylinder that contains a hole where the upper portion of the level switch 232 fits into place. A switch locking block 216 acts to lock the level switch 232 into place with the switch meeting tube 214. The locking block 216 is cylindrical and contains a hole through which a tube may pass. Referencing FIG. 11, an insulator tube 242 surrounds the switch meeting tube 214 and upper portion of the level switch 232 assembly. O-rings 224 maintain a seal between the level switch 232 and the inside of tube 245 and the insulator tube 242. As shown in FIG. 11, the lead wires 238 from the level switch 232 in an insulating sheath 254 run through a tube 255 up the standpipe 208.

Just above the level switch 232 assembly, a snap ring 222 connects tube 246 with the top portion of pump housing 210 containing the piston 206. In addition, a male connector 236 connects tube 254 to the top of the pump housing 210.

The pump functions by a solenoid valve in the control box 500 sending air down either tube 244 or tube 246. The air goes down one tube and back up the other, until the solenoid is reversed, and then the air flows in the opposite direction. In one direction, the air actuates the piston 206 and pumps de-iceant 102 up tube 245. In the other direction, the piston goes back up. While that happens, de-iceant is drawn into the pump base 212. Check valves 204 and 205 control the flow direction of the de-iceant. The rate at which de-iceant is pumped depends upon the rate at which the solenoid is activated, which controls the cycle rate of the piston 206.

Figure 12:
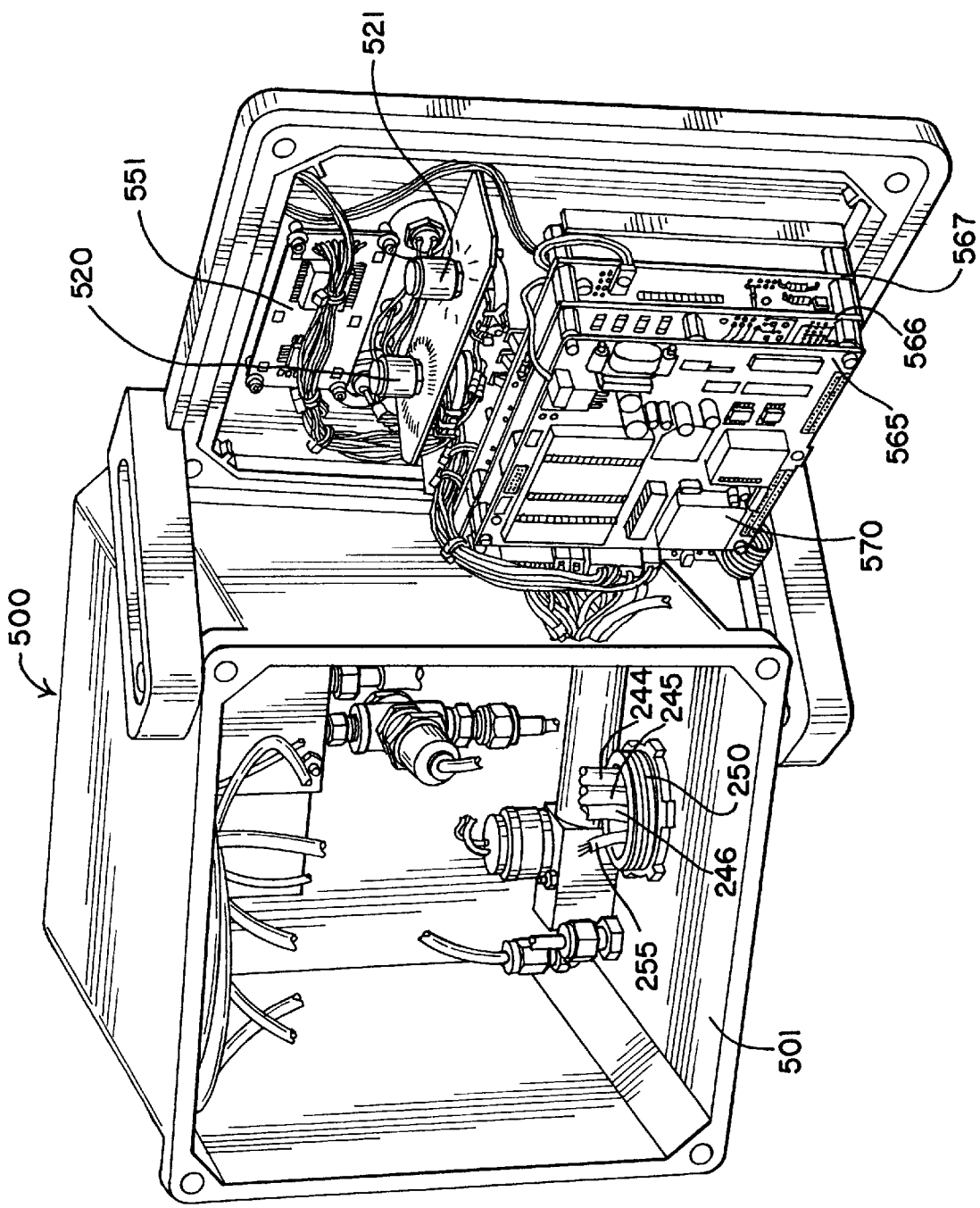

The control box 500 is attached to the top of the pump standpipe 208. The control box 500 is shown in FIG. 12. The control box 500 contains three subsystems. These are the de-iceant fluid subsystem, the pump operating air subsystem and an electrical system. Schematic drawings of the first two subsystems are shown on FIGS. 17 and 18. The de-iceant fluid system subassembly shown in FIG. 14 and the air system subassembly shown in FIG. 13 have the parts arranged a little differently than the parts shown in FIG. 12. The position of the standpipe adapter 250 and the tubes 244, 245, 246 and 255 are preferably as shown in FIG. 12. The air and de-iceant subassemblies are preferably as shown in FIGS. 13 and 14.

Figure 17:
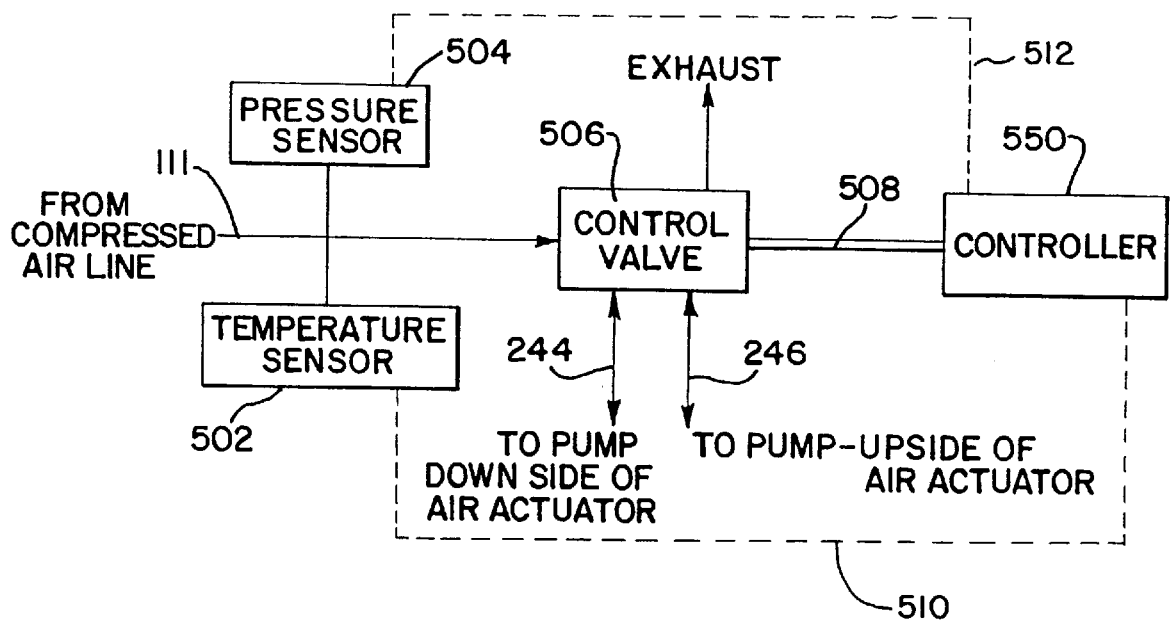

FIGS. 14 and 17 show air from the compressed air supply line entering the base 501 of control box through hose 111 (also shown FIG. 2). A temperature sensor 502 and pressure sensor 504 are connected to this incoming air source by tee 503. The compressed air thereafter goes to control valve 506. This is the valve that supplies compressed air to the actuator 226 in the pump 200. In this way, energy from the compressed air in the main air supply line 106 is used to operate the pump 200. The control valve 506 has a shuttle solenoid in it, which shuttles back and forth to send air down tube 244 while exhausting air from tube 246, or sending air down tube 246 while exhausting air from tube 244. Air exhausted from valve 506 passes through an exhaust port 507 connected to a tube 509 passing out of the bottom 501 of control box 500. Electronic controller 550 electrically controls valve 506 by electrical current sent through wires 508. Electrical signals from the temperature sensor 502 are carried to the electronic controller 550 by wires 510. Electrical signals are carried to the electronic controller 550 from the pressure sensor 504 by wires 512.

Figure 18:
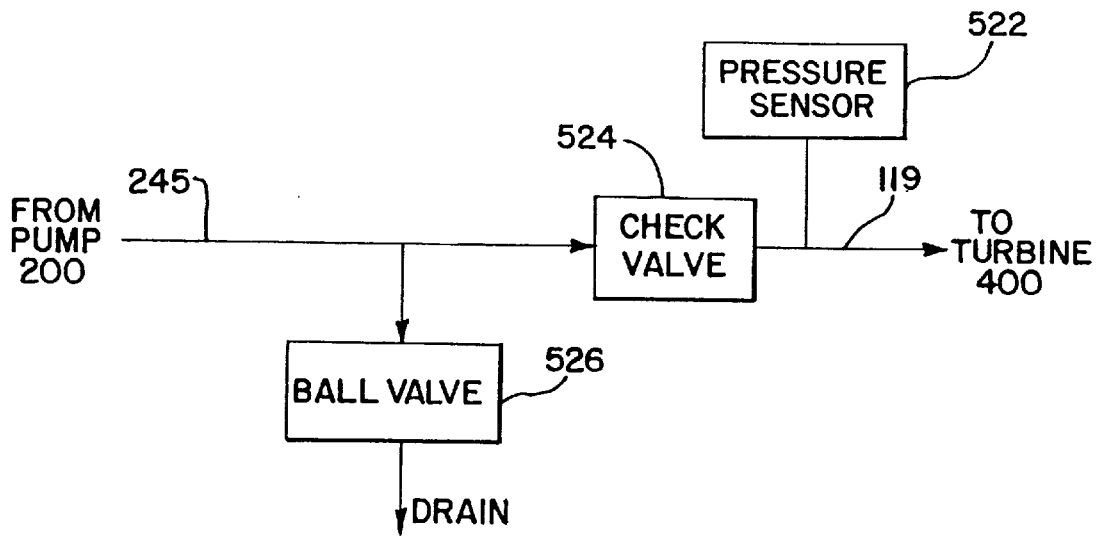

FIGS. 14 and 18 show the de-iceant fluid subsystem. De-iceant from pump 200 is fed through tube 245 into control box 500. A ball valve 526 is used to prime the pump when the pump first operates. The ball valve 526 is mounted on the base 501 of the control box 500 and is connected by tee 513 to the de-iceant line 245. The ball valve 526 is opened to allow unpressurized operation. Once de-iceant appears at the ball valve, the ball valve is closed. Thereafter, the de-iceant passes through a check valve 524. A pressure sensor 522 senses the pressure of de-iceant after the check valve 524 as the de-iceant flows to the turbine 400 through hose 119 and conduit 116 (FIG. 3). Wires 514 carry a signal from the pump pressure sensor 522 to the electrical controller.

FIG. 23 is a block diagram showing the major components making up the electrical system and their relationship. The wires from the different sensors and the turbine, as well as many of the components of the electrical system, may primarily be connected together through the circuit boards 565, 566 and 567, mounted on the front door of the control box 500 as shown in FIG. 12. Circuit board 565 includes a microprocessor 570. Circuit board 566 is referred to as the signal card in FIG. 23. Circuit board 567 is referred to as the power card in FIG. 23. The electrical system has three major components; a voltage regulator circuit 560, a valve driver circuit 562 and a microprocessor 570, these last two being part of the controller 550.

Figure 20:
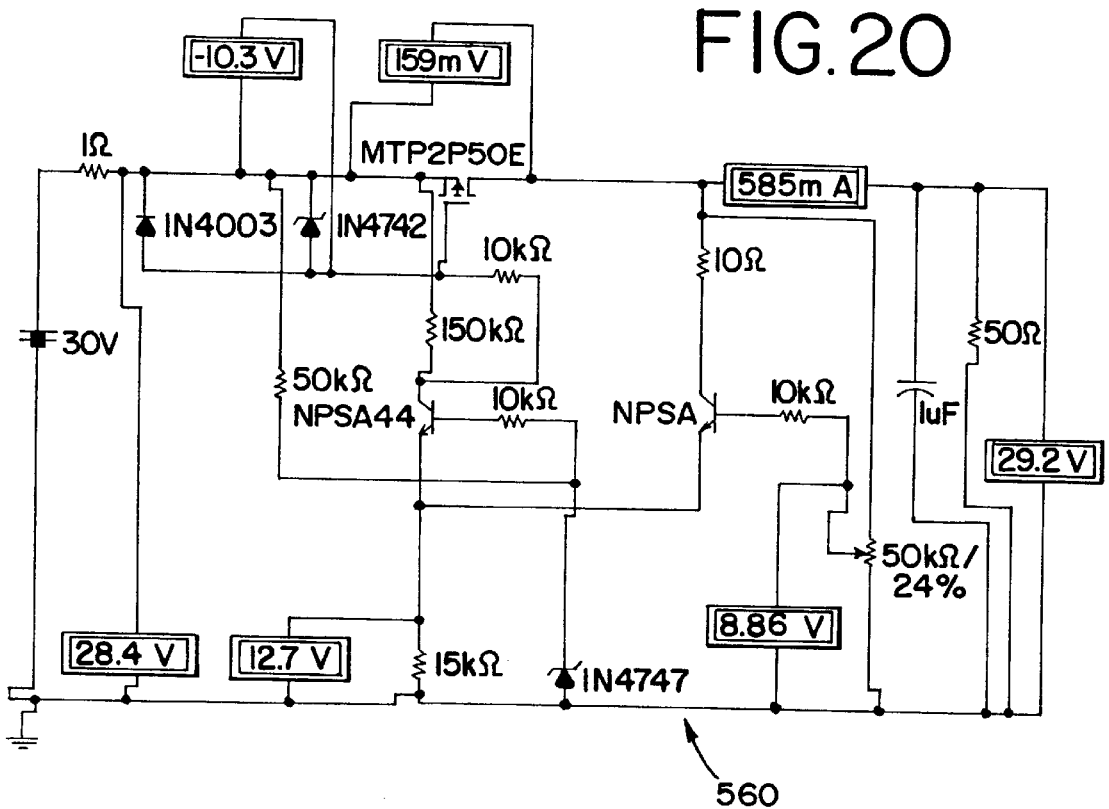
Figure 21:
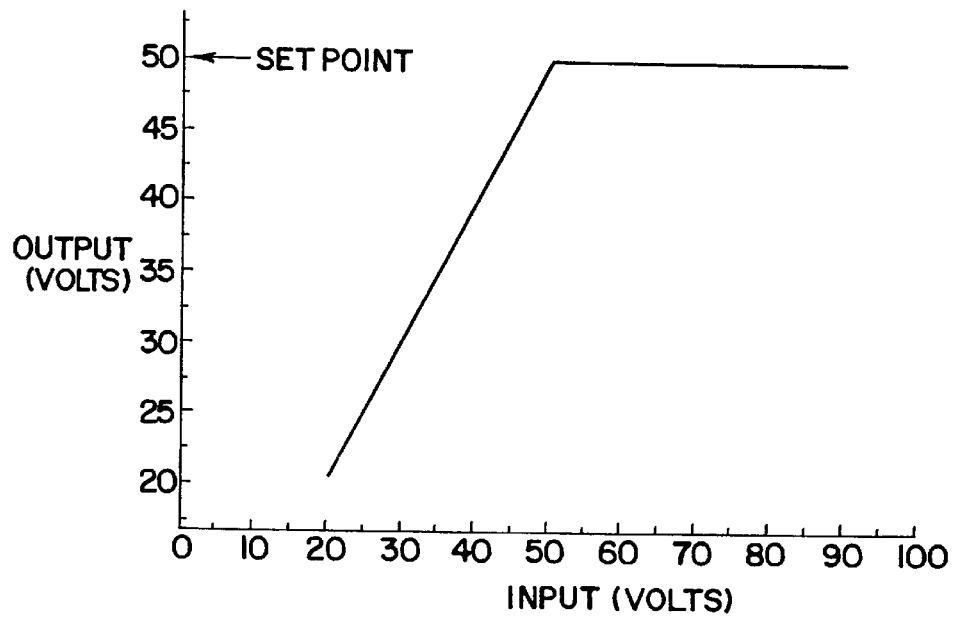

The voltage regulator circuit, shown in FIG. 20, takes the varying alternating voltage output of the generator built into turbine 400, passed through a three phase full wave bridge rectifier 515, and provides a regulated DC voltage for the control functions. The circuit 560 includes a power field effect transistor series regulator and a regulator reference amplifier. The input to the circuit 560 will vary, but may be 400 volts or more, depending on the speed of the turbine 400. FIG. 21 shows the output of the circuit 560 as a function of the input voltage, tested with a 500 ohm load. The desired maximum output of circuit 560 is 50 volts, which is converted into 12 volts by down converter 516. The foregoing items are isolated on the power card by conventional optical barrier technology using optical couplings so that the high voltage input to the power card will not be able to pass to other parts of the electrical system, since voltages of 400 volts could be dangerous.

The frequency of the alternating current is used to measure of the speed of the generator by a speed detector/pulse generator 517. The power card 567 also includes a 5 volt DC down converter 518 and the valve driver circuit 562. The valve driver circuit 562 functions to operate the solenoid control valve 506 that ports the driving air for the de-iceant pump 200. This circuit has an output frequency proportional to the required pump flow as determined by the microprocessor computations. The signal card 566 includes a tank sensor current regulator circuit 530 and amplifiers 531, 533 and 534 as shown in FIG. 23.

Figure 15:
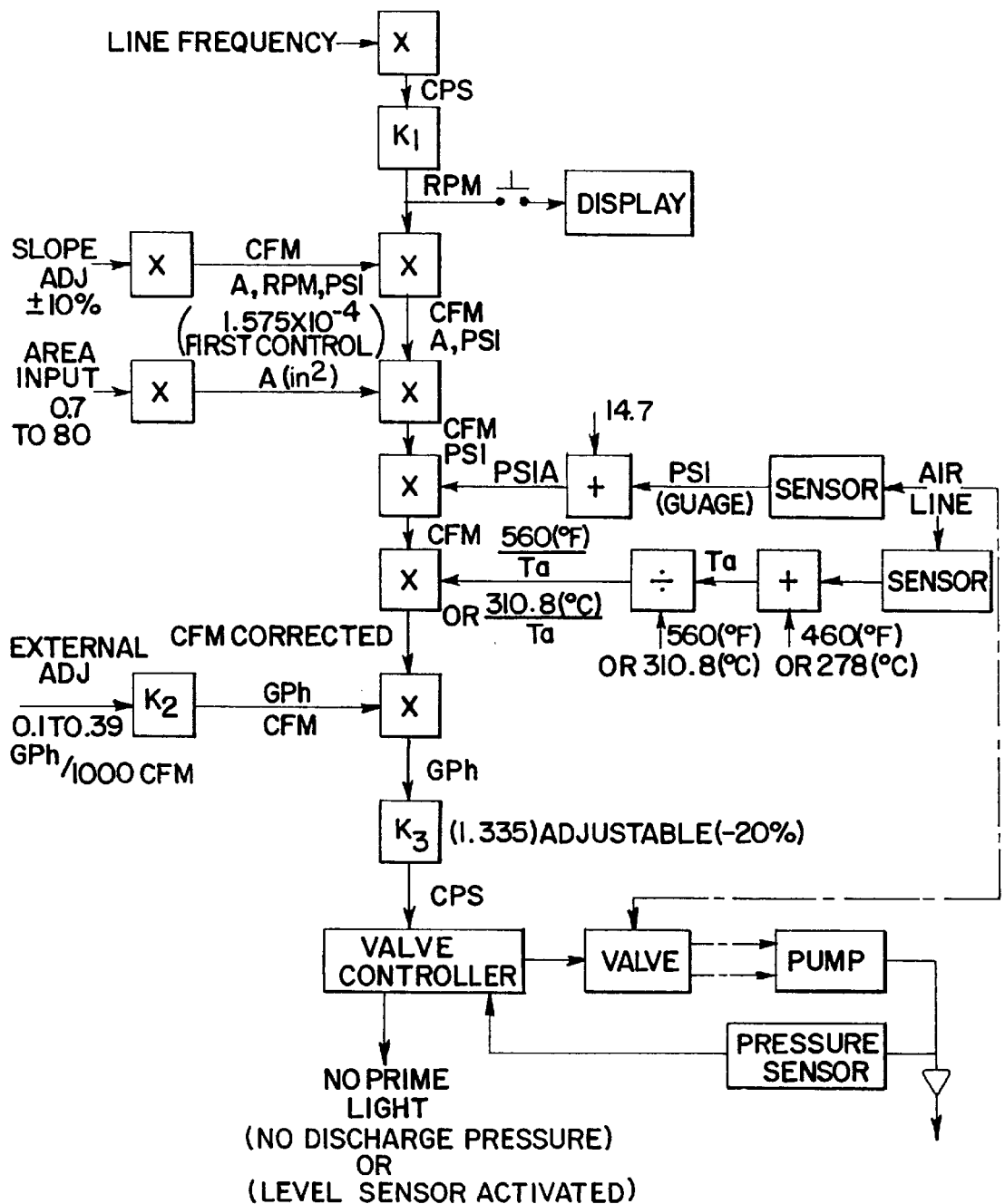
Figure 19:
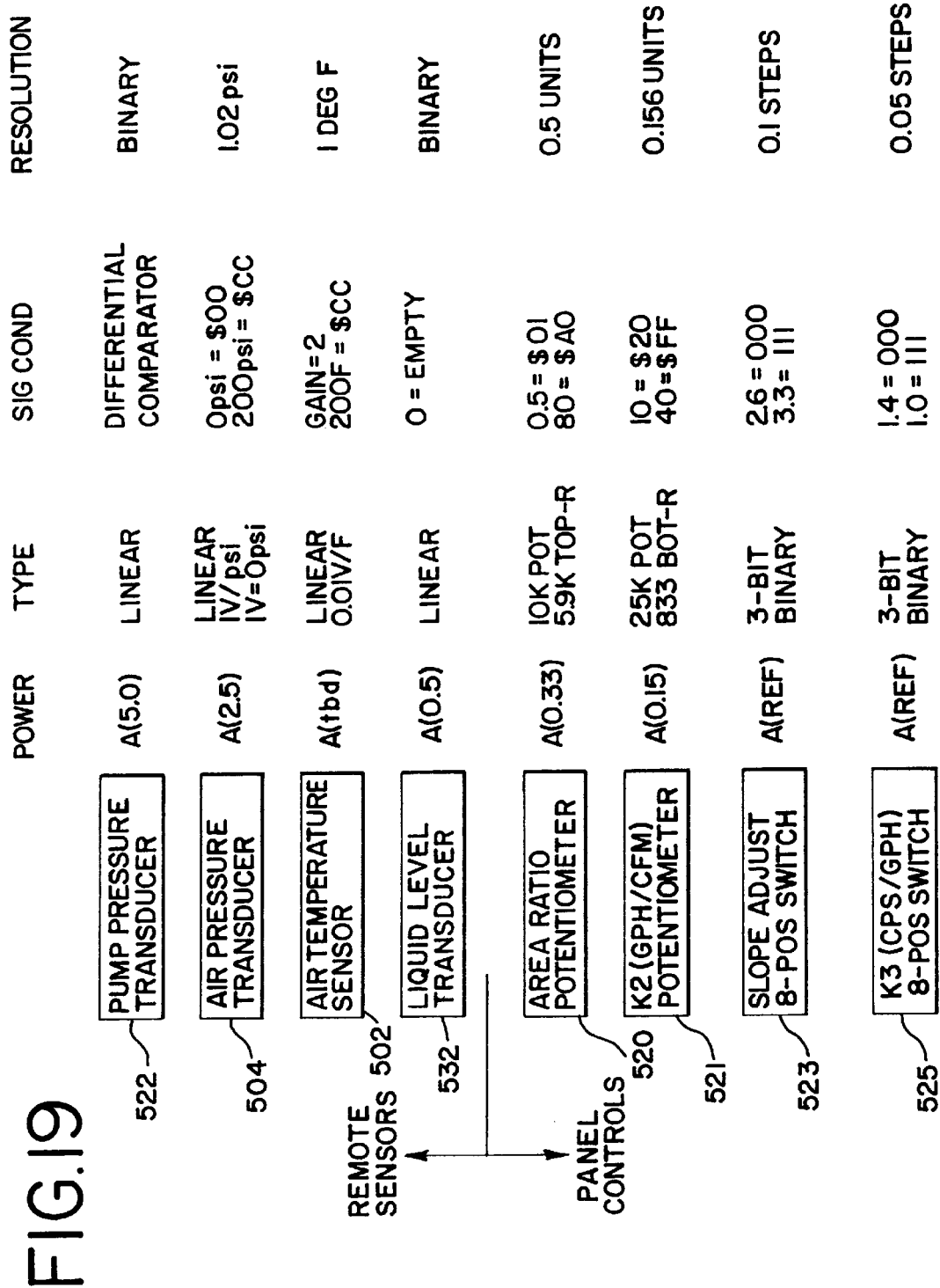

In addition to the frequency of the alternating current from the turbine, the microprocessor 570 uses the air supply pressure from pressure sensor 504, the air temperature from sensor 502, and several other input settings to control the rate of operation of the control valve 506. FIG. 15 shows a block diagram of the calculation that is used so that the pump will supply, and the turbine 400 will atomize, an amount of de-iceant that is proportional to the flow of air in the main air line 106. FIG. 19 is a table of the inputs to the microprocessor. The pump pressure transducer 522 and liquid level transducer 532 (which may be used in place of the level switch 232) are used to detect conditions requiring the system to shut down. If the liquid level transducer 532 indicates a low level of de-iceant, the system will shut down. The pump pressure transducer 522 signal is input to a differential detector and comparator circuit 519 (FIG. 23) which monitors peak pulse and overall liquid pressure. If the peak pulses or the integrated pressure show that the pump is not operating correctly, an error is signaled. The other microprocessor inputs are used to regulate the pump, including: 1) a flow area ratio potentiometer 520 input setting (which will vary with the adapter plate 108 used and is a function of the amount of air going through the housing 460, and thus past the turbine, compared to the amount of air going through other passageways 60 through plate 108), 2) a K2 potentiometer 521 input for setting the desired ratio of de-iceant fluid to air flow (between 0.1 and 0.39 gallons of de-iceant per hour for each 1000 cfm of air), 3) a slope adjust multiposition switch 523 input that will adjust for differences between actual air flows and theoretical air flow determined from the turbine speed and 4) a K3 multiposition switch 525 which is set at each installation depending on the efficiency of the particular pump. As shown in FIG. 15, the K3 switch allows for adjustment as may be needed over time if the pump efficiency deteriorates.

Figure 16:
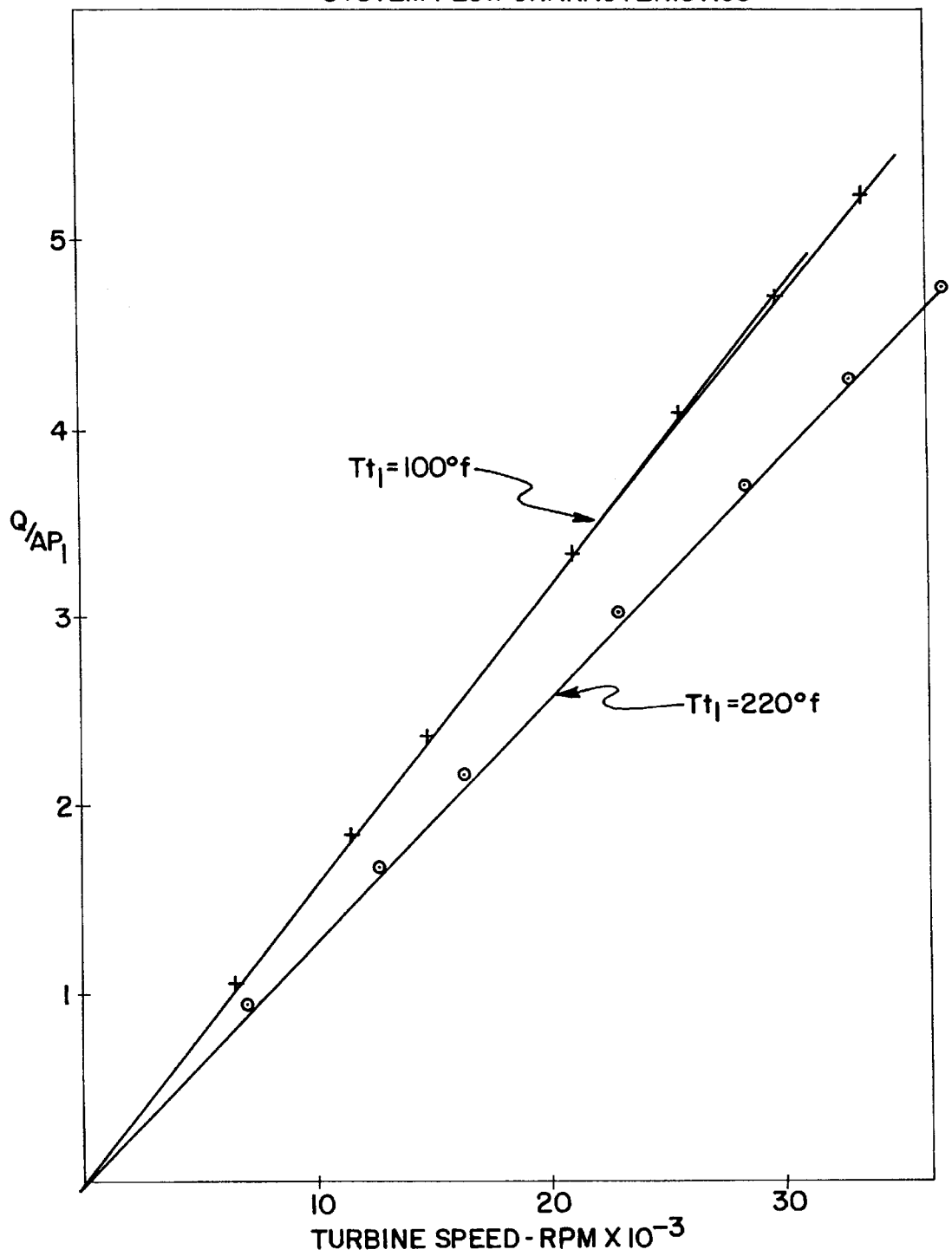

FIG. 16 shows theoretical lines and actual data points demonstrating the correlation of turbine speed, ambient air flow, area and air line pressure. Q is the quantity of air in cubic feet per minute (cfm). A is the cross-section area of the pipe in which the turbine was mounted. P is the air pressure.

The control box 500 includes a control panel which has an LCD 551, preferably with a bright LCD backlight, a stop button 552 and a start/prime button 553. In addition, there are three indicator lights 554 which signal if the tank is low, if the pump is not operating properly, or if there is another error, which is then explained on LCD 551. The LCD routinely displays four indications; a bar graph showing the level of de-iceant in barrel 300, the turbine speed in rpm, the air flow rate in cfm and the pump discharge pressure in psig.

Many of the above-listed features of the controller are implemented with programming code. Preferably, the operating code provided in Appendix A, along with a floating point code of Appendix B, is loaded or otherwise provided onto the microprocessor 570. FIG. 22 gives a flow chart of the control code of Appendix A. The hexadecimal numbers in brackets on FIG. 22 refer to the portion of the code of the Appendixes where the particular function is programmed. There is a calibration routine built into the program code which is available when the system is started or reset. The code operates the system on a 64 millisecond cycle of four 16 millisecond sequences each. On the second sequence, the generator (turbine) speed is measured. If the turbine is not spining fast enough, the maximum 12 millisecond counting window will detect this problem and register an error code. Other problems picked up by sensors being out of prescribed ranges, such as the liquid level being too low, or the pump pressure being too low or too high, also register an error code. In the fourth sequence, these error codes are read ("ohoh" flag byte) and signals are generated to light the warning indicators 554 and provide an error message on the LCD display 551. The microprocessor 570 is preferably part of a control board, such as MPU card CDA11 from Axiom Mfg., Richardson, Tex.

As discussed above, different plates or adapters 108 are used for each size of line 106, but the same turbine 400 and housing 460 may be used on each plate. Of course, the ratio of the amount of air passing through the turbine compared to the air passing through the line will vary with the size of bypass passageways 60 in the plate or adapter 108. The total flow area of this arrangement is therefore an input variable for the control box 500. The plate or adapter 108 is also designed so that the turbine 400 will reach a minimum operational speed when the compressed air system in which it is installed is operating at its expected minimum value. In this way sufficient voltage (20 volts min.) is assured to generate a 12 volt DC current for the control system when the turbine is running at 5500 rpm. Ordinarily the turbine will run at 8,000 to 10,000 rpm. The area ratio potentiometer 520 and K2 multiposition switch 521 used to control the amount of de-iceant per unit volume of air may be mounted as shown in FIG. 12. The slope adjust switch 523 and K3 multiposition switch 525 are mounted directly on the circuit boards and are adjusted with a screw driver when the controller is installed at a location. Even though these multiposition switches are noted on FIG. 19 as 8-position switches, they may have 10,16 or any other number of positions.

Preferably pushing the start button 553 also activates a manular pulser circuit 527 (FIG. 23) to primp the pump 200.

The preferred embodiment of the invention is designed for use with propylene glycol based de-iceants, which generally have viscosities in the range of 0.1 to 40 centipoise. However, the invention also provides a superior method for supplying and vaporizing alcohol-based de-iceants into large compressed air lines as well. The preferred turbine is sized to be operational in an air supply line carrying 250 cfm of compressed air. However, the system is more practical for use with air supply rates over 1000 cfm.

As noted earlier, the pressure sensitive level switch 232 may preferably be substituted with a transducer 532 to detect the pressure, and hence the amount, of de-iceant in the barrel 300. This value can be displayed as a bar graph on LCD 551 so that the operator knows how much fluid remains in the barrel 300, and if a minimum fluid level is reached, the pump can be shut off to prevent it from being run dry. Preferably the system is set up so that a warning indicator 554 lights and the pump 200 stops when the barrerl 300 reaches the one quarter full level, but automatically restarts when the barrel is refilled to a level of at least one half full. Alternatively, rather than being a continuous function liquid level, the detector could just indicate a low level condition to shut down the pump.

Some transducers 532 may not need a current regulator circuit 530. Also, because the pump pulses, if the transducer would be harmed by large peaks, a pulsation dampener in the liquid circuit may be required.

The preferred embodiment of the turbine produces an alternating electrical current, the frequency of which is then be used as an input to the controller to reflect the air speed past the turbine. Alternatively, the turbine could produce direct current with a voltage proportional to turbine speed, or some other form of electrical signal that was dependent on speed.

As shown in FIG. 2, the tube 111 taps into main airline 106 to get the compressed air to power the pump 200. Alternatively, the adaptor plate 108 could be provided with another passageway and connector to allow tube 111 to connect to the plate 108, reducing the number of alterations to the compressed air system needed to install the present invention. If air is withdrawn from the compressed air line before being treated with de-iceant precautions may be needed to prevent freezeups due to moisture in the air, such as including heater wires in the air lines, particularly at any orifices.

In the preferred embodiment, the turbine produces the electrical current used to operate the controller. Alternatively, the controller could use a different source of power. The pump is powered by compressed air from the main air supply line. It could also be powered from a different source.

The preferred turbine serves several functions. In different embodiments of the invention, those functions could be served by different pieces of equipment. A turbine could be used to measure air flow as air usage fluctuates, and the de-iceant could be dispersed into the air flow by an atomizer.

In the preferred embodiment the connections between the liquid, air and electrical lines between the control box 500 and the adapter plate 108 are designed to be standard fittings that are weatherproof but that can be easily connected and disconnected in cold weather. The connections can preferably be made by a worker who is wearing gloves and using a common wrench. The air and de-iceant lines preferably use commercially available compression fitting connectors and the electrical connectors are preferably spring loaded plugs.

The preferred plate or adapter 108 is preferably made of aluminum and epoxy and is molded. It is designed with flanges that will mate with standard flanges on the pipe and withstand a maximum of 150 psig pressure.

The preferred adapter or plate 108 will be designed for each installation so that desired air flow will pass through housing 460. For example, if the installation has a maximum air flow of 2500 cfm, an adapter or plate 108 that forces all air through the housing could be used. However, if higher air flow rates are to be encountered, only part of the flow should go through the housing, otherwise the turbine would spin at an excessive speed. The ratio of air flow through the other apertures 60 in the plate or adapter compared to flow through housing 460 will thus vary so that minimum turbine speeds are maintained but excessive turbine speeds are avoided.

The preferred turbine and adapter plate will only generate a 3 psi pressure drop yet produce a turbine speed of 30,000–33,000 rpm. To get adequate voltage at low turbine speeds, the number of windings in the stator can be increased.

It should be understood that many changes and modifications can be made to the embodiments described above. It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. A method of dispersing de-iceant into a stream of air flowing through a compressed air supply line comprising the steps of:
   a) placing a turbine in the compressed air supply line and supplying de-iceant to the turbine;

b) forcing at least a portion of the stream of compressed air to pass through the turbine, thus causing the turbine to spin;

c) using the spinning turbine to atomize the de-iceant into the stream of flowing air; and d) delivering the flowing air with de-iceant therein to downstream compressed air usage devices so as to prevent said compressed air using devices from freezing up.

2. The method of claim 1 wherein the air flows through the air supply line at a rate of at least 1000 cfm.

3. The method of claim 1 wherein the turbine includes a centrifuging lip and the de-iceant breaks up from a thin film into tiny droplets as the turbine spins the de-iceant off of the lip.

4. The method of claim 1 wherein the de-iceant is dispersed at a rate proportional to the rate of air flow through the air supply line.

5. The method of claim 1 wherein the turbine includes an electrical generator and the rate at which de-iceant is supplied to the turbine is controlled by a controller based on the output of the electrical generator.

6. The method of claim 5 wherein said output of the generator on which the rate of de-iceant supply is based is an alternating current frequency.

7. The method of claim 1 wherein the de-iceant is supplied from a container containing liquid de-iceant.

8. The method of claim 7 wherein a liquid level sensor is used to determine the level of de-iceant in the container.

9. The method of claim 4 wherein a controller causes the de-iceant to be supplied at a rate proportional to the rate of compressed air flow.

10. The method of claim 9 wherein the controller is adjustable and the method comprises adjusting the proportionality of the de-iceant supply rate to the rate of flow of compressed air.

11. The method of claim 5 wherein the generator supplies electrical power to operate the controller.

12. A method of adding de-iceant to compressed air comprising the steps of:

a) detecting the rate of flow of compressed air through an air supply line; and b) pumping de-iceant from a de-iceant supply source and dispersing the de-iceant into the air flowing through the air supply line at a rate proportional to the detected rate of flow of compressed air through the air supply line, whereby the de-iceant prevents a downstream compressed air usage device from freezing up.

13. The method of claim 12 wherein the rate of flow of compressed air through the air supply line is detected by detecting the speed of a turbine located in the air supply line.

14. The method of claim 13 wherein the turbine generates an electrical signal indicative of the speed of the turbine.

15. The method of claim 12 wherein the de-iceant is pumped from a container by a pump submersed in the de-iceant.

16. The method of claim 13 wherein the de-iceant is dispersed by the turbine by being ejected into the flow of compressed air normal to the direction of air flow.

17. The method of claim 12 wherein a turbine is used to detect the rate of flow of compressed air and a pump feeds the de-iceant at a rate proportional to the turbine speed.

18. The method of claim 12 wherein a turbine is used to disperse the de-iceant into the flow of compressed air.

19. The method of claim 17 wherein the pump is powered by compressed air.

20. The method of claim 12 wherein the proportionality of the rate at which de-iceant is pumped is controlled by a controller and the rate is adjustable.

21. The method of claim 20 wherein the controller uses the pressure of air in the air supply line as an input.

22. The method of claim 19 wherein the pump is submerged in de-iceant and exhausts the compressed air used to power the pump outside of the de-iceant.

23. The method of claim 17 wherein a controller is used to control the feed rate of the de-iceant and the controller includes a pressure detector detecting the pressure of the de-iceant being supplied by the pump.

24. A method of preventing water in compressed air from freezing up inside of a compressed air supply line and a compressed air usage device comprising the steps of:

a) forcing compressed air through the air supply line to one or more compressed air usage devices;

b) causing a turbine to spin at a rate proportional to the rate of air flow through the compressed air supply line; and c) dispersing de-iceant into the compressed air flowing through the air supply line at a rate proportional to the turbine speed.

25. The method of claim 24 wherein the de-iceant is in the form of a liquid having a viscosity in the range of 0.1 to 40 centipoise.

26. The method of claim 24 wherein the turbine disperses the de-iceant using centrifugal force.

27. The method of claim 26 wherein the turbine is located in a main air supply line and the compressed air usage devices are connected to the main air supply line by branch air supply lines.

28. The method of claim 26 wherein the de-iceant is supplied to the turbine by a pump.

29. The method of claim 24 wherein a de-iceant supply device is connected to the turbine and a de-iceant source.

30. The method of claim 29 wherein the turbine is connected to the de-iceant supply device by a conduit through which de-iceant flows from the de-iceant supply device to the turbine.

31. The method of claim 29 wherein the turbine is connected to the de-iceant supply device by a wire that transmits a signal to control the amount of de-iceant supplied to the air supply line.

32. The method of claim 29 wherein the turbine is connected to the de-iceant supply device by both;

a) a conduit through which de-iceant flows from the supply device to the turbine; and b) a wire that transmits a signal to control the amount of de-iceant supplied to the turbine.

33. The method of claim 24 wherein the air supply line comprises a main air supply line and branch air supply lines and the turbine is located in the main air supply line.

34. The method of claim 24 wherein the one or more compressed air usage devices comprises a plurality of artificial snow making devices.

35. The method of claim 29 wherein the de-iceant source comprises a container containing liquid de-iceant.

36. The method of claim 35 wherein the de-iceant is supplied to be dispersed by a pump and a controller.

37. The method of claim 24 wherein a restrictor is placed in the air supply line to direct a predetermined portion of the air flowing through the air supply line to pass through the turbine.

38. The method of claim 24 wherein compressed air from the air supply line is used to power a supply device that supplies the de-iceant being dispersed.

39. The method of claim 36 wherein the turbine generates an alternating current which is used as an input in the controller.

40. The method of claim 39 wherein the frequency of the alternating current generated by the turbine is proportional to the rate of compressed air flowing through the air supply line and de-iceant is supplied to the turbine and is dispersed thereby at a rate proportional to the frequency of the alternating current.

41. The method of claim 24 wherein the turbine both generates an electrical current and disperses the de-iceant and wherein the turbine comprises:
   a) a rotatable shaft;
   b) a rotor connected to the shaft;
   c) a stator surrounding the rotor, said stator being prevented from turning;
   d) electrical conductors connected to the stator;
   e) one or more blades connected to the rotating shaft at an angle to the direction of flow of air past the shaft so as to cause the shaft to rotate as air flows past the blades;
   f) a centrifuging surface connected to the shaft; and
   g) a conduit supplying de-iceant to the centrifuging surface.

42. The method of claim 41 wherein the centrifuging surface comprises a centrifuging lip.

43. The method of claim 41 wherein the shaft has a hollow portion, the hollow portion constituting a part of said conduit.

44. The method of claim 41 wherein the rotor comprises a permanent magnet.

45. The method of claim 43 wherein the conduit includes multiple flow channels extending from the hollow portion of the shaft to the centrifuging surface.

46. The method of claim 41 wherein a housing is used to secure the turbine inside of the air supply line through which compressed air flows.

47. The method of claim 46 wherein the housing comprises passageways through which the electrical conductors and the de-iceant pass.

* * * * *

UNITED STATES PATENT AND TRADEMARK OFFICE
CERTIFICATE OF CORRECTION

PATENT NO. : 6,231,313 B1
DATED : May 15, 2001
INVENTOR(S) : A. M. Heitmann et al.

It is certified that error appears in the above-identified patent and that said Letters Patent is hereby corrected as shown below:

Column 14,
Line 57, delete ";" (semicolon) and substitute -- : -- (colon) in its place.

Column 16,
Line 7, after "conduit" insert -- for --.

Signed and Sealed this

Fourth Day of June, 2002

Attest:

JAMES E. ROGAN
Attesting Officer
Director of the United States Patent and Trademark Office